United States Patent
Habibi et al.

(10) Patent No.: US 12,094,491 B2
(45) Date of Patent: Sep. 17, 2024

(54) HEATSINK STRUCTURES FOR HEAT-ASSISTED MAGNETIC RECORDING HEADS

(71) Applicant: Seagate Technology LLC, Fremont, CA (US)

(72) Inventors: Helene Parwana Habibi, Londonderry (GB); Simon Bance, Londonderry (GB); Martin Liam McGarry, Ballymena (GB); Raul Horacio Andruet, Woodbury, MN (US); Martin Giles Blaber, Minneapolis, MN (US); Weibin Chen, Edina, MN (US); John Charles Duda, Bloomington, MN (US); Mark Anthony Gubbins, Donegal (IE); Erik Jon Hutchinson, Eden Prairie, MN (US); Vivek Krishnamurthy, Edina, MN (US); Michael Allen Seigler, Eden Prairie, MN (US); Chen Wang, Fremont, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/081,527

(22) Filed: Dec. 14, 2022

(65) Prior Publication Data
US 2023/0110250 A1    Apr. 13, 2023

Related U.S. Application Data

(62) Division of application No. 17/319,444, filed on May 13, 2021, now Pat. No. 11,538,496, which is a
(Continued)

(51) Int. Cl.
*G11B 11/105* (2006.01)
*G11B 5/187* (2006.01)
(Continued)

(52) U.S. Cl.
CPC ........ *G11B 11/10536* (2013.01); *G11B 5/187* (2013.01); *G11B 5/3106* (2013.01);
(Continued)

(58) Field of Classification Search
None
See application file for complete search history.

(56) References Cited

U.S. PATENT DOCUMENTS 8,307,540 B1    11/2012  Tran et al.
8,320,219 B1 *  11/2012  Wolf ..................... G11B 5/314
                                                              360/125.74
(Continued)

FOREIGN PATENT DOCUMENTS

GB          2539554         12/2016
KR     20160055081 A *       5/2016  ........... G11B 5/6088

*Primary Examiner* — William J Klimowicz
(74) *Attorney, Agent, or Firm* — Mueting Raasch Group

(57) ABSTRACT

A recording head comprises a write pole extending to an air-bearing surface. A near-field transducer is positioned proximate a first side of the write pole in a down-track direction. A heatsink structure is proximate the near-field transducer and positioned between the near-field transducer and the write pole. The heatsink structure extends beyond the near-field transducer in a cross-track direction and extends in a direction normal to the air-bearing surface.

18 Claims, 19 Drawing Sheets

Related U.S. Application Data division of application No. 16/520,629, filed on Jul. 24, 2019, now Pat. No. 11,011,201.

(51) Int. Cl.
| | |
|---|---|
| *G11B 5/31* | (2006.01) |
| *G11B 5/40* | (2006.01) |
| *G11B 11/24* | (2006.01) |
| *G11B 13/08* | (2006.01) |
| *G11B 5/00* | (2006.01) |

(52) U.S. Cl.
CPC .......... *G11B 5/3116* (2013.01); *G11B 5/3133* (2013.01); *G11B 5/3136* (2013.01); *G11B 5/314* (2013.01); *G11B 5/40* (2013.01); *G11B 11/24* (2013.01); *G11B 13/08* (2013.01); *G11B 2005/0021* (2013.01)

(56) References Cited

U.S. PATENT DOCUMENTS

| | | | |
|---|---|---|---|
| 8,320,220 B1 | 11/2012 | Yuan et al. | |
| 8,472,288 B1 | 6/2013 | Wolf et al. | |
| 8,477,454 B2 | 7/2013 | Zou et al. | |
| 8,593,916 B2 | 11/2013 | Ikai et al. | |
| 8,902,719 B2 | 12/2014 | Zhao et al. | |
| 8,913,468 B1 | 12/2014 | Peng | |
| 8,923,100 B1 | 12/2014 | Wessel et al. | |
| 8,958,271 B1 * | 2/2015 | Peng .................... | G11B 5/6088 369/13.13 |
| 9,099,114 B1 | 8/2015 | Balamane et al. | |
| 9,147,427 B1 | 9/2015 | Lee et al. | |
| 9,449,626 B2 | 9/2016 | Lee et al. | |
| 9,536,555 B1 * | 1/2017 | Duda .................... | G11B 5/4866 |
| 9,620,152 B2 | 4/2017 | Kautzky et al. | |
| 9,626,991 B2 | 4/2017 | Chen et al. | |
| 9,672,848 B2 | 6/2017 | Blaber et al. | |
| 9,685,202 B1 | 6/2017 | Duda et al. | |
| 9,697,856 B2 | 7/2017 | Jayashankar et al. | |
| 9,728,209 B2 | 8/2017 | Chen et al. | |
| 9,799,352 B1 | 10/2017 | Chen et al. | |
| 9,865,283 B2 | 1/2018 | Blaber et al. | |
| 9,905,253 B1 | 2/2018 | Lee | |
| 9,972,346 B2 | 5/2018 | Blaber et al. | |
| 10,056,101 B1 * | 8/2018 | Wessel ................. | G11B 5/6088 |
| 10,186,292 B1 | 1/2019 | Krishnamurthy et al. | |
| 10,438,617 B2 | 10/2019 | Gorantla et al. | |
| 10,490,215 B1 | 11/2019 | Chen | |
| 10,490,221 B1 | 11/2019 | Chen | |
| 10,714,137 B1 | 7/2020 | Krishnamurthy et al. | |
| 10,770,098 B1 | 9/2020 | Peng | |
| 10,811,035 B1 | 10/2020 | Lee et al. | |
| 11,107,496 B2 | 8/2021 | Zhao et al. | |
| 11,189,312 B1 | 11/2021 | Huang | |
| 2010/0123967 A1 * | 5/2010 | Batra .................... | G11B 5/3116 360/59 |
| 2012/0045662 A1 * | 2/2012 | Zou ...................... | G11B 5/3133 428/810 |
| 2013/0064051 A1 * | 3/2013 | Peng .................... | G11B 5/3133 427/127 |
| 2013/0100783 A1 * | 4/2013 | Ostrowski ............ | G11B 5/3136 |
| 2014/0050058 A1 | 2/2014 | Zou et al. | |
| 2014/0307534 A1 * | 10/2014 | Zhou .................... | G11B 5/314 216/22 |
| 2015/0071045 A1 | 3/2015 | Zhou et al. | |
| 2016/0300589 A1 * | 10/2016 | Chen .................... | G11B 5/6088 |
| 2016/0351208 A1 | 12/2016 | Matsumoto et al. | |
| 2019/0057717 A1 | 2/2019 | Chen | |

* cited by examiner

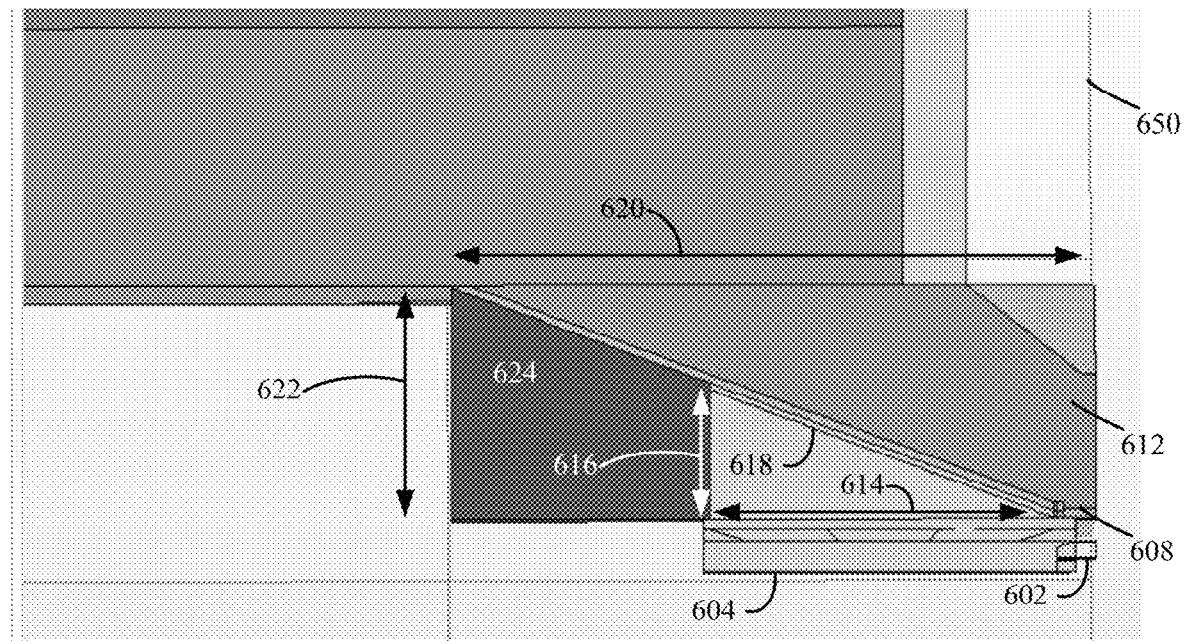
*FIG. 6A*
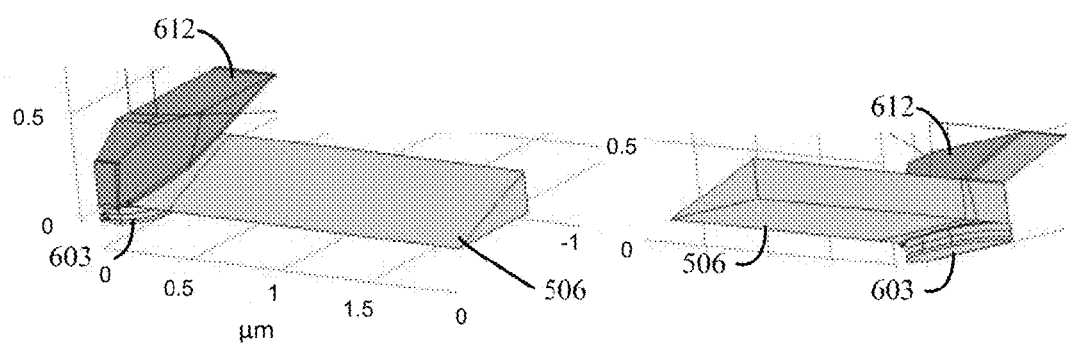
*FIG. 6B*  *FIG. 6C*

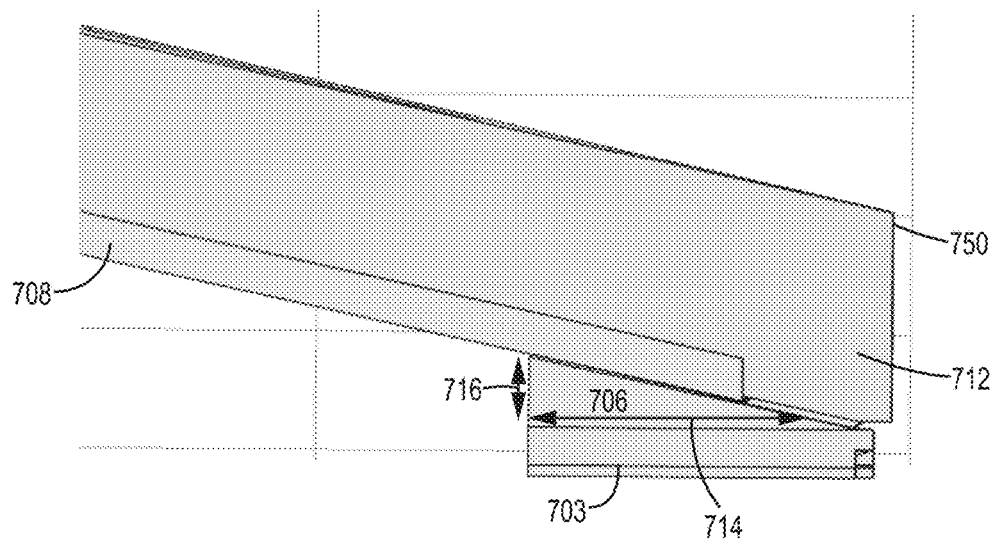
FIG. 7A
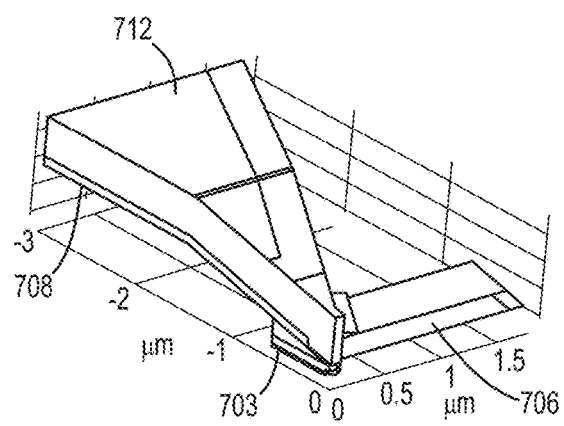 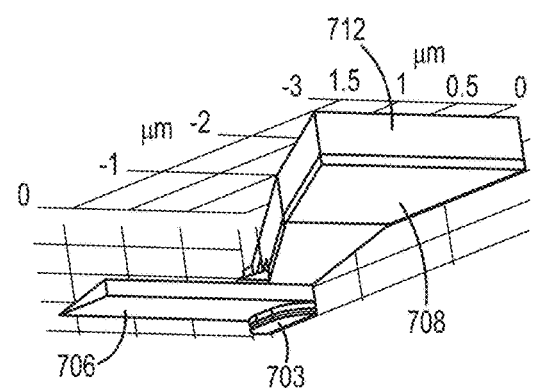
FIG. 7B          FIG. 7C

FIG. 12D                    FIG. 12E

HEATSINK STRUCTURES FOR HEAT-ASSISTED MAGNETIC RECORDING HEADS

RELATED APPLICATIONS

This application is a divisional of U.S. application Ser. No. 17/319,444 filed on May 13, 2021, which is a divisional of U.S. application Ser. No. 16/520,629 filed on Jul. 24, 2019, now U.S. Pat. No. 11,011,201, which are incorporated herein by reference in their entireties.

SUMMARY

Embodiments of the disclosure are directed to a recording head comprising a write pole extending to an air-bearing surface and a near-field transducer positioned proximate a first side of the write pole in a down-track direction. A heatsink structure is proximate the near-field transducer and positioned between the near-field transducer and the write pole. The heatsink structure extends beyond the near-field transducer in a cross-track direction and extends in a direction normal to the air-bearing surface.

Further embodiments are directed to a recording head comprising a write pole extending to an air-bearing surface and a near-field transducer positioned proximate a first side of the write pole in a down-track direction. The near-field transducer comprises a peg coupled with a bottom portion having a first shape. A heatsink structure is adjacent and coupled to the bottom portion and positioned between the near-field transducer and the write pole. The heatsink structure has a first surface having a second shape corresponding to the first shape and an opposing surface that is sloped toward the first surface.

Additional embodiments are directed to a recording head comprising a write pole extending to an air-bearing surface and a near-field transducer positioned proximate a first side of the write pole in a down-track direction. First and second mirror portions form a mirror and surround the near-field transducer in a cross-track direction with a gap therebetween. The mirror extends in the direction normal to the air-bearing surface a first distance that is less than a second distance that the near-field transducer extends in the direction normal to the air-bearing surface. First second heatsink structures are positioned adjacent the first and second mirror portions. The heatsink structures extend in a cross-track direction and extend in a direction normal to the air-bearing surface a third distance, which is greater than the second distance.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

FIG. 6A is a cross-sectional view of the heatsink structure of FIG. 5A coupled with a first write pole design according to embodiments discussed herein;

FIG. 6B is a side perspective view of the heatsink structure of FIG. 6A according to embodiments discussed herein;

FIG. 6C is a rear perspective view of the heatsink structure of FIG. 6A according to embodiments discussed herein;

FIG. 7A is a cross-sectional view of the heatsink structure of FIG. 5A coupled with a second write pole design according to embodiments discussed herein;

FIG. 7B is a side perspective view of the heatsink structure of FIG. 7A according to embodiments discussed herein;

FIG. 7C is a rear perspective view of the heatsink structure of FIG. 7A according to embodiments discussed herein;

FIG. 12D illustrates the effective current as a function of the slope angle of the heatsink structure of FIG. 11;

FIG. 12E illustrates the reflections as a function of slope angle of the heatsink structure of FIG. 11;

FIG. 15A top down half view of a heatsink structure according to embodiments discussed herein;

DETAILED DESCRIPTION

Figure 1:
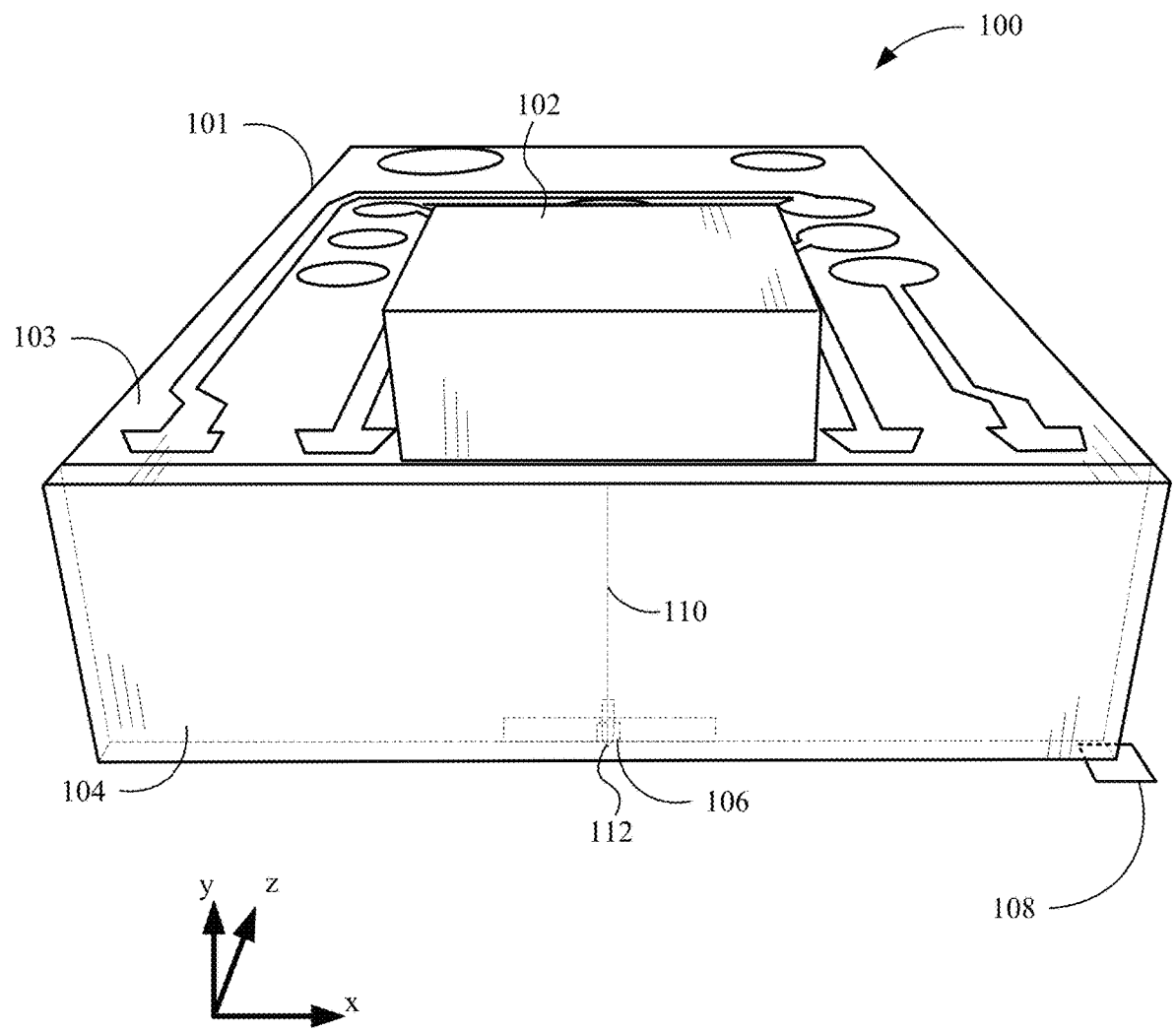
FIG. 1 is a perspective view of a HAMR slider assembly according to embodiments discussed herein.

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a source of optical energy (e.g., a laser diode) is integrated with a recording head and couples optical energy to a waveguide or other light transmission path. The waveguide delivers the optical energy to a near-field transducer (NFT). The NFT concentrates the optical energy into a tiny optical spot in a recording layer of a magnetic recording medium, which raises the medium's temperature locally, reducing the writing magnetic field required for high-density recording.

A HAMR read/write element, sometimes referred to as a slider, recording head, read head, write head, read/write head, etc., includes magnetic read and write transducers similar to those on current hard drives. For example, a magnetoresistive sensor reads data by detecting magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. The HAMR slider also includes a source of energy, such as a laser diode, to heat the media while it is being written to by the write pole. An optical delivery path, such as a waveguide, is integrated into the HAMR slider to deliver the energy to the surface of the media.

The optical delivery path of a HAMR slider may include a plasmonic transducer proximate a media-facing surface (e.g., air-bearing surface (ABS), contact surface). The plasmonic transducer shapes and transmits the energy to a small region on the medium. The plasmonic transducer is sometimes referred to as a near-field transducer, optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature (Tc) and having dimensions less than 100 nm (e.g., ~50 nm).

However, the heat generated in the head during write operations, particularly proximate the media-facing surface near critical components such as the NFT and write pole, can exceed 300° C. These temperatures are greater than the temperature at which the slider protective overcoat degrades. For example, diamond-like carbon (DLC), a typical overcoat material, degrades at about 135-150° C. The high temperatures increase rates of reduction, oxidation, and corrosion of head components leading to deformation, delamination, and failure of the head. Embodiments discussed herein are directed to heatsinking structures that reduce temperatures in the head overall and in particular critical components. In certain embodiments, the temperatures are reduced below activation energies of unwanted processes to minimize or eliminate the negative effects of those processes.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite a media-facing surface 108 that is positioned over a surface of a recording media (not shown) during device operation. The media facing surface 108 faces, and is held proximate to, the moving media surface while reading and writing to the media. The media-facing surface 108 may be configured as an air-bearing surface that maintains separation from the media surface via a thin layer of air.

The laser diode 102 delivers light to a region proximate a HAMR read/write head 106, which is located near the media-facing surface 108. The energy heats the recording media as it passes by the read/write head 106. Optical coupling components, such as a waveguide system 110, are integrally formed within the slider body 101 (e.g., near a trailing edge surface 104 of the slider) and function as an optical path that delivers energy from the laser diode 102 to the recording media via a NFT 112. The NFT 112 is proximate the writer of the read/write head 106 and causes heating of the media during recording operations.

The laser diode 102 may be configured as either an edge-emitting laser or surface-emitting laser. While the representative embodiment in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be externally mounted to the slider 100, and coupled to the slider by way of optic fiber and/or a waveguide. An input surface of the slider body 103 may include a grating or other coupling feature to receive light from the laser via the optic fiber and/or waveguide.

Figure 2:
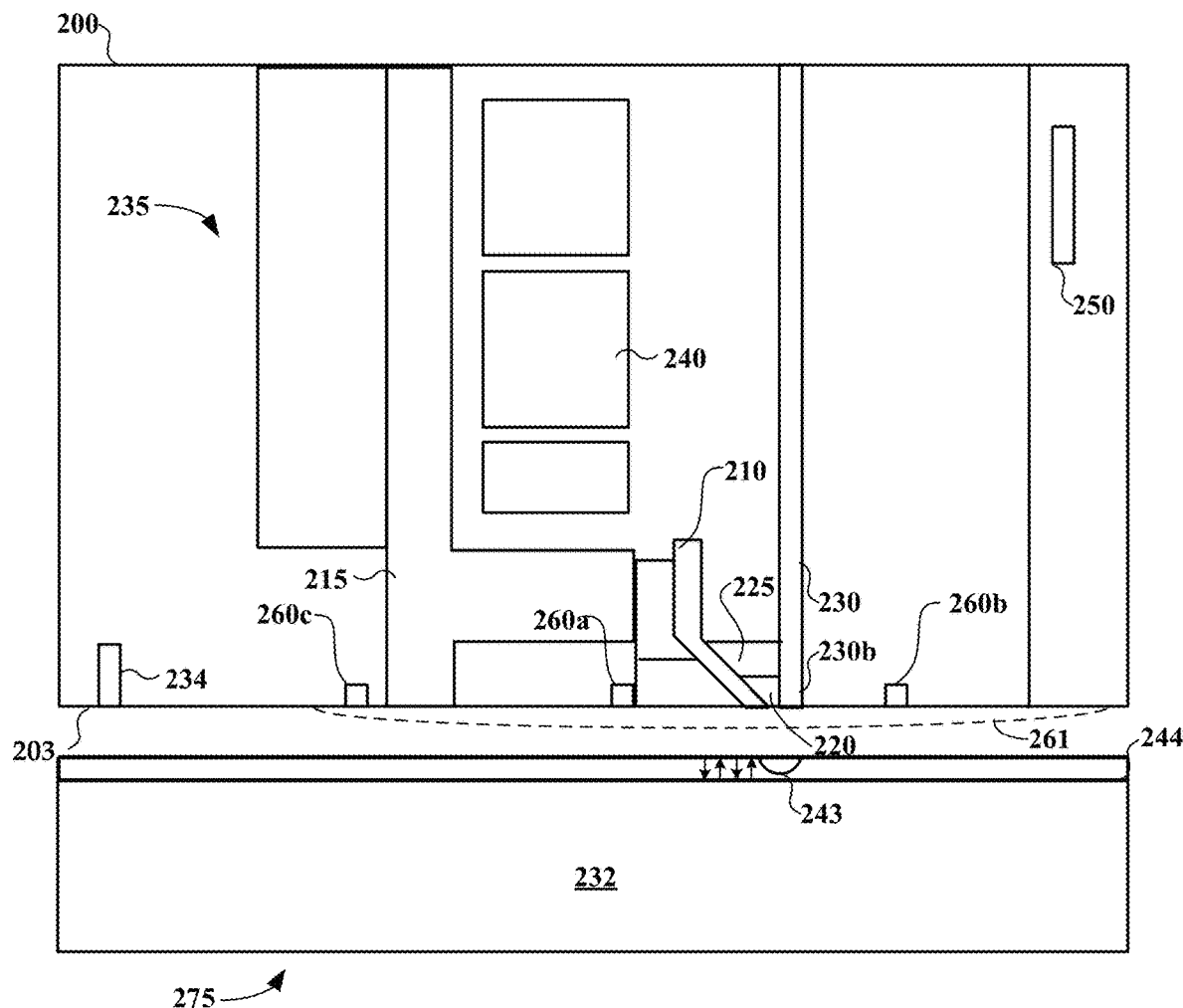
FIG. 2 is a cross-sectional view of a HAMR slider assembly according to embodiments discussed herein.

In FIG. 2, a cross-section diagram shows a slider 200 according to various embodiments. The head transducer 200 is shown positioned over a writeable medium 275 (e.g., magnetic disk) that generally includes a substrate 232 on which at least a hard magnetic layer 244 is deposited or otherwise formed. An NFT 220 is located between a write pole 210 and a waveguide 230 at a media-facing surface 203. A small portion or spot 243 of the layer 244 is heated via waveguide 230 and NFT 220 to reduce the coercivity of the material enough so that the magnetic field from the magnetic write pole 210 is strong enough to change the magnetization direction of the recording layer 244. Bits of information may then be recorded in the form of a perpendicular upward/downward magnetization direction for a series of magnetic domains in the layer 244.

The portion of head transducer 200 illustrated in FIG. 2 may include a number of heat generating components at the media-facing surface 203, such as write coil 240, NFT 220, and a heater 250. Due to thermal expansion of the surrounding material (e.g., dielectric material), the heat can cause a thermal protrusion at the media-facing surface 203, indicated by dashed line 261. Generally, the heater 250 is used to finely adjust head-media spacing near the protrusion to obtain a desired spacing between the media 275 and read/write transducers 234, 235.

This head-media spacing can also be referred to as the slider's fly height. It is often desirable to have a relatively small distance or spacing between a recording head transducer and its associated medium. By reducing the head-media spacing, a recording head transducer is typically better able to both write and read data to and from a medium. Reducing the head-media spacing also allows for surveying of recording medium topography, such as for detecting asperities and other features of the recording medium surface.

One or more thermal sensors, e.g., temperature coefficient of resistance (TCR) sensors or differential-ended temperature coefficient of resistance (DETCR) sensors, can be located within a protrusion region at one or more optional locations. Historically these sensors have been used during manufacturing to set head-disk spacing or to detect thermal asperities (TA) on an associated medium during a certification process. As shown in FIG. 2, optional thermal sensors 260a, 260b, 260c are located at different locations within the region of protrusion 261. In many embodiments, only one thermal sensor is used. In some embodiments, as illustrated by thermal sensor 260a, a thermal sensor is located in the region of the writer 235, near the write pole 210, return pole 215, and/or the NFT 220. Thermal sensor 260b may be referred to as a leading sensor as it will pass over the media prior to the NFT and write pole. A thermal sensor may also be located proximate the reader if used primarily for thermal asperity detection.

Thermal sensors 260a, 260b, 260c are coupled to signal processing circuitry as is known in the art. The circuitry determines temperatures at or near the media-facing surface 203, and those measured temperatures can be used for a number of purposes, such as controlling the heater 250 to adjust head-media spacing at the protrusion region 261, detecting contact with the recording medium, and/or monitoring the power of the laser diode. It has been demonstrated that for a head transducer having a thermal sensor reasonably close to the NFT 220, it is possible to measure changes in thermal conductance across the head-disc interface and to use this to monitor changes, such as those due to clearance changes or due to contamination. In addition to monitoring and controlling the heater 250, heat transfer is controlled in the head 200 with the inclusion of one or more heatsinking structures 225, which are discussed further below.

Figure 3:
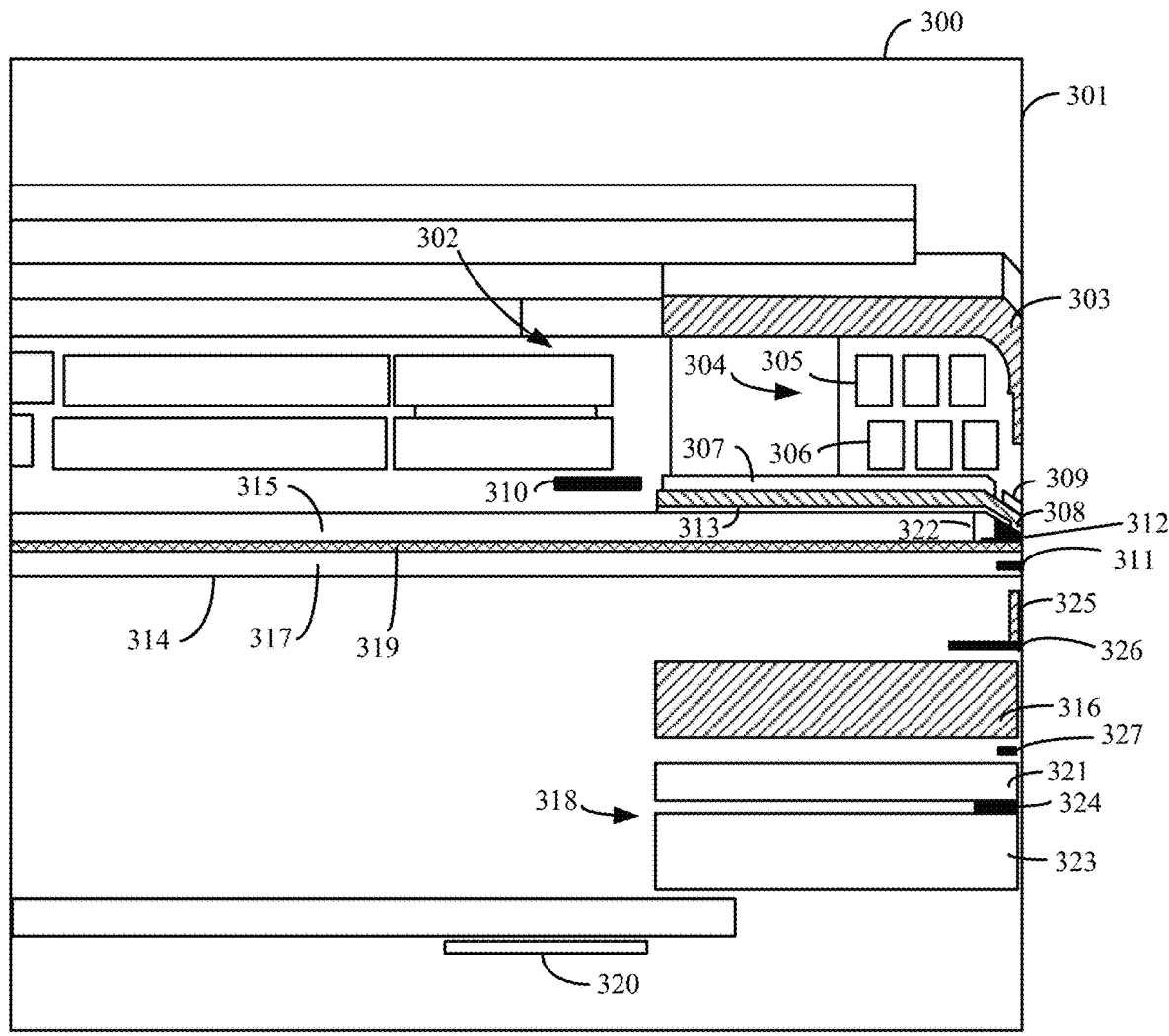
FIG. 3 is a cross-sectional view of portions of a slider body near an air-bearing surface according to embodiments discussed herein.

In FIG. 3, a cross-sectional view illustrates portions of the slider body 300 near the media-facing ABS 301 in further detail according to various embodiments. A writer 302 includes a number of components, including a second return pole 303 proximate a write coil 304. The write coil 304 includes an upper coil 305 and a lower coil 306. The write coil 304 may conform to any writer coil design, including a double-pancake design, single-layer pancake design, or a helical coil design, for example.

The write coil 304 is configured to energize a write pole 308. A magnetic yoke 307 is disposed between the write coil 304 and the write pole 308. A heatsink structure, e.g., a write pole heatsink, 309 is thermally coupled to the write pole 308. A writer heater 310 is positioned proximate the write pole 308 and is configured to thermally actuate the write pole 308 during write operations. An NFT 312 is situated proximate the write pole 308 and is optically coupled to an optical waveguide 314. The waveguide 314 includes an upper cladding layer 315, a lower cladding layer 317, and a core 319 between the upper and lower cladding layers 315, 317. A diffuser 313 thermally couples to the NFT 312 and extends between at least a portion of the write pole 308 and the upper cladding layer 315. One or more additional heatsink structures 322 thermally couple the NFT 312 to the diffuser 313 and/or other heatsink structures (e.g., the write pole heatsink 309). The writer 302 also includes a leading shield 325, a reflector 326 positioned at or near the ABS, and a first return pole 316, which is magnetically coupled to the write pole 308 and the second return pole 303. The slider 300 also includes a reader 318. The reader 318 includes a read element 324 (e.g., a GMR sensor) disposed between a pair of reader shields 321, 323. A reader heater 320 is located proximate the reader 318, which is configured to thermally actuate the reader 318 during read operations.

A contact sensor 311 may be positioned at or near the ABS 301 in the waveguide cladding 317. At this location, the contact sensor 311 is arranged to detect contact between a close point of the writer 302 (when thermally actuated by one or more heating elements) and a magnetic recording medium. The slider 300 also includes a contact sensor 327 positioned proximate the reader 318. The contact sensor 327 is configured to detect contact between a close point of the reader 318 (when thermally actuated by one or more heating elements) and the recording medium. In some embodiments, the writer contact sensor 311 is coupled (in series or in parallel) to the reader contact sensor 327. In other embodiments, the writer and reader contact sensors 311 and 327 are independent of each other.

The contact sensors 311, 327 are typically thermal sensors having a temperature coefficient of resistance (referred to herein as TCR sensors, such as a differential-ended TCR sensor or DETCR). A DETCR sensor is configured to operate with each of its two electrical contacts or leads (ends) connected to respective bias sources provided by a pair of electrical bond pads of the slider. According to various embodiments described herein, the thermal sensor may be referred to as a contact sensor, a thermal asperity sensor, a laser power monitor, and/or a DETCR. The TCR sensors 311, 327 are configured to sense changes in heat flow for detecting onset of head-medium contact. The TCR sensor 311 is also configured to sense changes in temperature due to light absorption from the waveguide core 319 for monitoring laser power.

Thermal sensor 311 is located on the leading edge, or position, of the slider to pass over the media prior to the NFT and write pole. As a DETCR, the laser power monitoring signal of sensor 311 comes from the temperature change and the resulting resistance change ($\Delta V \sim \Delta R^* I_{bias}$). Therefore, the change in resistance ($\Delta R$) between the laser being "on" and the laser being "off" represents the signal strength. When the laser goes from "off" to "on," three sources can lead to the change in sensor resistance: 1) heat transfer from the NFT region (the closer to the NFT, the higher the $\Delta R$), 2) light absorption (light escaping from the waveguide core), and 3) media back heating (likely an overall small effect on the $\Delta R$). However, a higher change in resistance is accompanied by higher temperatures. Therefore, a stronger signal (higher $\Delta R$) is countered with lower reliability (higher temperature) for the thermal sensor 311.

This is also true for the head overall—higher temperatures lead to reliability issues. Reduction, oxidation, and corrosion of metal and dielectric components at, or near, the media-facing surface are accelerated by increasing temperatures. Thus, high temperatures cause head components to move, deform (e.g, change shapes), delaminate, and/or fail. Reducing the temperature of critical components, such as the NFT and write pole, reduces or slows the rate of oxidation, corrosion, reduction, deformation, and/or delamination of those components. Embodiments described herein are directed to various heatsinking structures that enable heat transfer while not interfering with the optical properties of the waveguide/NFT energy delivery components. Several of the described heatsinking structures are combinable with each other.

Figure 4A:
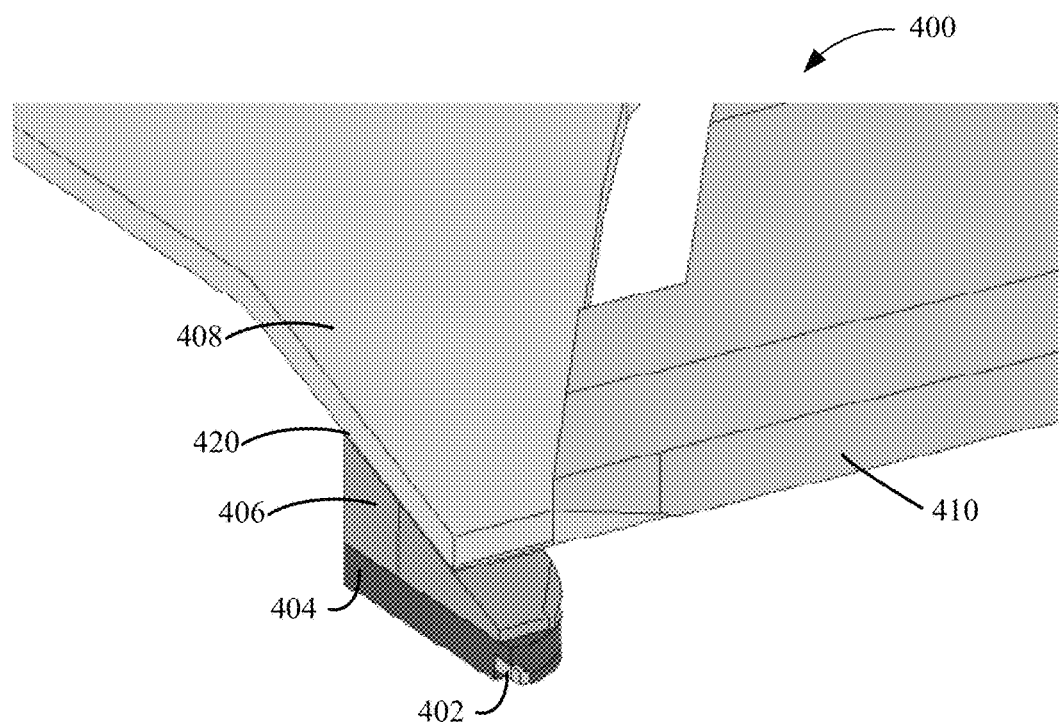
FIG. 4A is a perspective half view of heatsinking elements in a HAMR recording head according to embodiments discussed herein.

FIG. 4A provides a three-dimensional perspective view of certain thermal management components in a HAMR recording head 400. For ease of visualization, only half of the full-sized components are shown in FIG. 4A—reference number 420 illustrates a midline cut of the components such that the components would extend from both sides of midline 420 substantially symmetrically. The component generating the most heat in the head is typically the NFT. The NFT herein refers to a combination of the NFT peg 402 and the NFT bottom disc 404. The NFT peg 402 extends from the bottom disc 404 toward the media facing surface to transfer plasmon energy from the bottom disc 404 to the recording media. The bottom disc 404 is adjacent the waveguide and converts photons in the waveguide into surface plasmons. The bottom disc 404 serves as a heatsink for the peg 402. Heastsinking structures described herein are directed to heatsinking the NFT. A heatsink disc 406 is positioned adjacent the bottom disc 404 in the down-track direction, or "on top" in FIG. 4A. The heatsink disc 406 heatsinks the bottom disc 404 and can have a variety of shapes and sizes, but in certain embodiments the surface adjacent the bottom disc 404 has the same shape and size as the corresponding surface of the bottom disc 404. Adjacent the heatsink disc 406 is a diffuser 408. The diffuser heatsinks the heatsink disc 406 and thermally couples the heatsink disc 406 with a heat channel 410, which heatsinks the diffuser 408. Additional heatsinking components may be present further recessed in the head away from the media-facing surface, such as a 3D write pole heatsink (not shown). Each heatsinking component servers to transfer heat away from the NFT and, ultimately, out of the recording head 400.

Figure 4B:
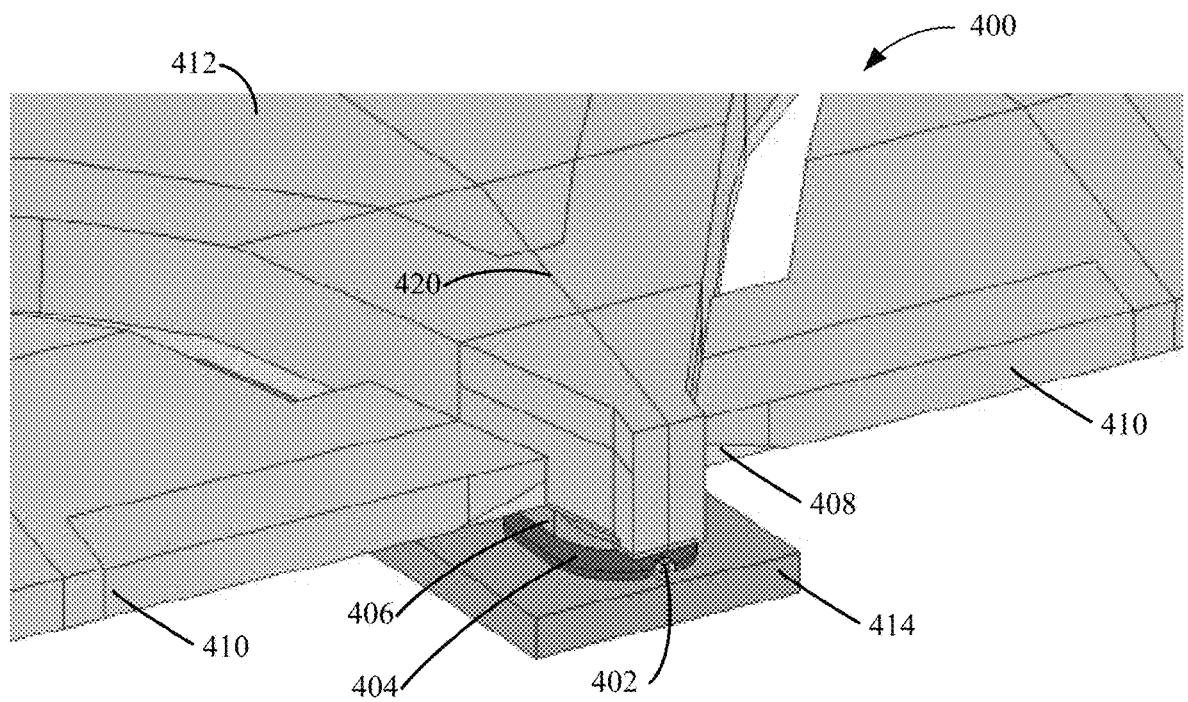
FIG. 4B is a perspective full view of the heatsinking elements of FIG. 4A according to embodiments discussed herein.

FIG. 4B provides additional context for the components of FIG. 4A by illustrating them coupled with a write pole 412 and an optical waveguide core 414. The heatsinking components discussed above also serve, in part, as heatsinks for the write pole 412 and core 414. In contrast to FIG. 4A, FIG. 4B illustrates the full sized-components, not half. Thus, the heat channel 410 and diffuser 408 are illustrated as extending in both cross-track directions from the NFT.

Figure 5A:
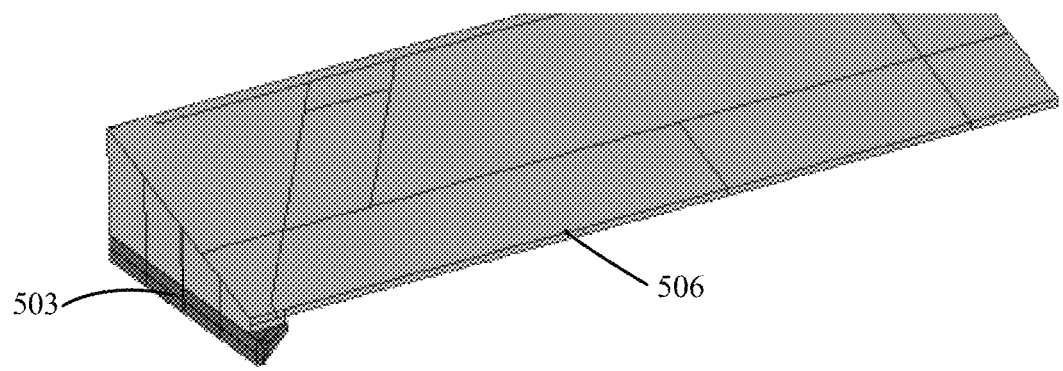
FIG. 5A is a perspective half view of a heatsink structure according to embodiments discussed herein.

A heatsink structure 506 according to certain embodiments is illustrated in FIG. 5A. The heatsink structure 506 is coupled to the NFT 503, which includes both a peg and a bottom portion. The heatsink structure 506 extends away from the air-bearing surface into the head for a width being substantially the same as the NFT. The heatsink structure 506 is also an extension to the side of a heat sink structure located underneath the write pole—it extends in the cross-track direction forming a "wing" shape. By being in close contact with the hottest portion in the head (i.e., the NFT peg), the heatsink structure 506 punctures heat from the NFT 503 and spreads it away from the peg. The profile of the heatsink structure 506 is substantially a wedge having a smaller thickness at an edge proximate the air-bearing surface and a greater thickness at an opposing edge surface distal the air-bearing surface. This shape increases the amount of thermally conductive material (e.g., gold) used to connect, or overlap, the NFT to other heatsink structures. In certain embodiments, a "top" surface connecting the two edges has a consistent slope forming the edge.

Figure 5B:
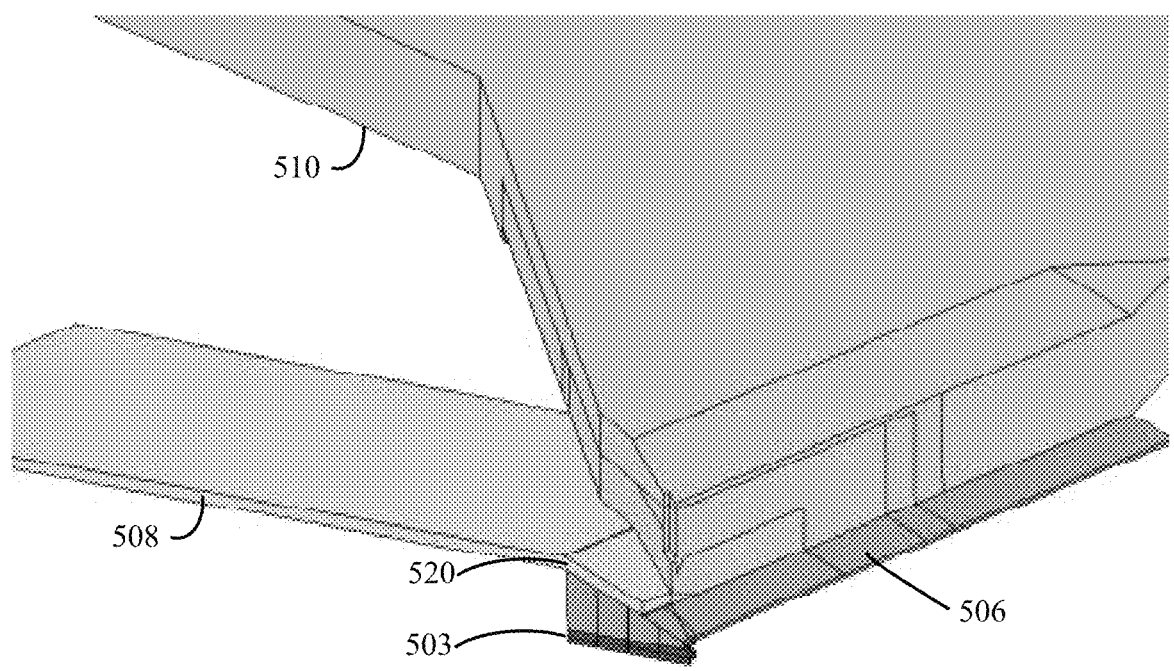
FIG. 5B is a perspective half view of the heatsink structure of FIG. 5A coupled to additional heatsink structures according to embodiments discussed herein.

Heatsink structure 506 enables the transfer/spread of heat from the NFT to the sides where it can be connected to other heatsinks. For example, in FIG. 5B the heatsink structure 506 of FIG. 5A is illustrated as coupled with a diffuser 508 and a heat channel 510. As can be seen, only half of the full-sized components are shown in FIG. 5A-B—reference number 520 illustrates a midline cut of the components such that the components would extend from both sides of midline 520 substantially symmetrically. Further details of the heatsink structure 506 of FIG. 5A are discussed below.

FIG. 6A illustrates a cross-sectional view of the heatsink structure 506. The heatsink structure is positioned between the NFT bottom portion 604 (and NFT peg 602) and the write pole 612. Between the write pole 612 and the heatsink structure is a diffuser 608. The "top" surface 618 of the heatsink structure follows the cut, or profile, of the write pole 612 and/or diffuser 608. The size and shape of the heatsink structure is dependent upon the write pole 612 configuration. For example, the heatsink structure of FIG.

6A has a width 614 (dimension extending from proximate the ABS 650 in a direction normal thereto into the recording head) of up to about 540 nm, and a maximum height 616 (at a distance most distal from the ABS) of up to about 200 nm. The write pole 612 configuration of FIG. 6A includes dielectric material 624 filling in behind the heatsink structure 506 within the recording head along the slope of the write pole 612 to the portion where the write pole 612 changes profile to be substantially parallel with the direction of the bottom portion 604. This dielectric material 624 extends from the distal portion of the heatsink structure 506 up to about one thousand nanometers into the recording head (shown by arrow 620). The dielectric material 624 has a maximum thickness (positioned distal from the ABS 650) of up to about 350 nm, illustrated by arrow 622. The configuration of the write pole 612 is further shown in the perspective view of FIG. 6B and the rear view of FIG. 6C, which illustrate how the write pole 612 is coupled to the heatsink structure 506 and NFT 603 (a combination of the bottom portion 604 and peg 602).

Extending the heatsink structure 506 in the cross-track direction addresses the concerns outlined above. For example, the process for fabricating the structure 506 is well-known and readily incorporated into manufacturing the head. The structure 506 provides a good heat path from the write pole 612 to a heat channel by connecting with a large heat channel 510. For example, the heatsink structure 506 can decrease temperatures in the recording head by about 50° C. from baseline measurements. The structure can be comprised of any number of thermally conductive materials that also have minimal or no interaction with the optical properties of the NFT and recording head, such as gold. In addition, the heatsink structure can be adapted to different write pole configurations, as shown further below.

FIG. 7A illustrates a cross-sectional view of a heatsink structure 706, similar to that of heatsink structure 506, but adapted to an alternative write pole configuration 712. The heatsink structure 706 is again positioned between the NFT 703 (including a bottom portion and peg) and the write pole 712. Between the write pole 712 and the heatsink structure 706 is a diffuser 708. The "top" surface of the heatsink structure 706 follows the cut, or profile, of the write pole 712 and/or diffuser 708. The shape of the heatsink structure 706 is generally the same "wedge" shape of heatsink 506; however, the dimensions change as being dependent upon the write pole 712 configuration. For example, the heatsink structure 706 has a width 714 (dimension extending from proximate the ABS 750 in a direction normal thereto into the recording head) of up to about 545 nm, and a maximum height 716 (at a distance most distal from the ABS 750) of up to about 120 nm. Similar to the structures discussed above, the heatsink structure 706 extends in the cross-track direction for length of about 2 μm. Also, similar to heatsink structure 506, heatsink structure 706 shares a bottom shape, and dimensions, with the bottom portion of the NFT 703, with the exception of the extension in the cross-track direction. The configuration of the write pole 712 is further shown in the perspective view of FIG. 7B and the rear view of FIG. 7C, which illustrate how the write pole 712 is coupled to the heatsink structure 706 and NFT 703.

As discussed above, heatsink 706 provides several of the same advantages as heatsink 506. Again, the process for fabricating the structure 706 is well-known and readily incorporated into manufacturing the head. The structure 706 provides a good heat path from the write pole 712 to a large heat channel, such as heat channel 510. For example, the heatsink structure 706 can decrease temperatures in the recording head by about 15° C. from baseline measurements. The structure can be comprised of any number of thermally conductive materials that also have minimal or no interaction with the optical properties of the NFT and recording head. One example of such materials is gold.

A comparison of the effects a heatsink structure has on the example alternative write pole configurations of FIGS. 6A and 7A is provided in Table 1 below. The table illustrates the amount of heatsinking the respective heatsink structures provide without disrupting optical efficiency.

TABLE 1

| Model | TG Down-track | TG Cross-track | $P_{req}$ (mW) | Head T (° C.) | Media T (° C.) | Pole T (° C.) |
| --- | --- | --- | --- | --- | --- | --- |
| FIG. 7A | 5.74 | 5.7 | 6.93 | 262.05 | 465.29 | 113.72 |
| FIG. 6A | 5.68 | 5.5 | 11.3 | 334.30 | 462.80 | 188.57 |
| FIG. 6A + heatsink 506 | 5.56 | 5.47 | 7.9 | 218.16 | 462.72 | 77.26 |
| FIG. 7A + heatsink 706 | 5.60 | 5.49 | 7.75 | 247.70 | 463.12 | 106.07 |

As shown, the heatsink structure decreases the temperature of the recording head as compared with a head without a heatsink structure extending in the cross-track direction (e.g., instead having a top disc heatsink structure as shown in FIG. 4A). Along with the decrease in temperature, the power required ($P_{req}$) for the optics is also improved by decreasing, which means an increase in efficiency. The decrease in temperature for the write pole tip (Pole T) lowers the likelihood and/or rate of write pole oxidation, which also extends the lifetime of the recording head.

Figure 8A:
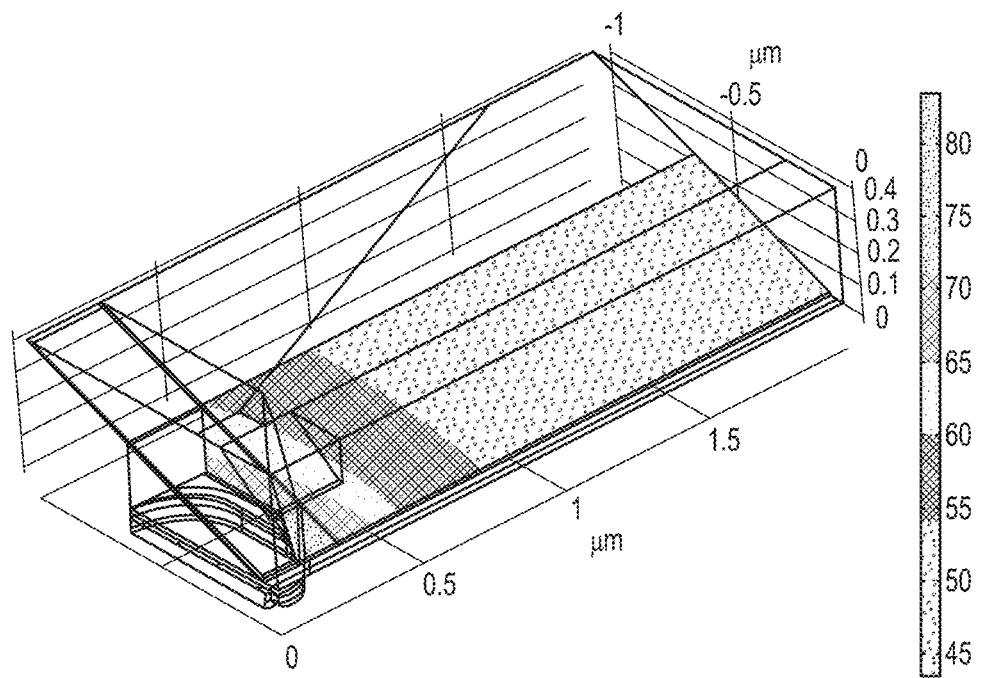
FIG. 8A is a heat distribution diagram for the heatsink structure of FIG. 6A according to embodiments described herein.
Figure 8B:
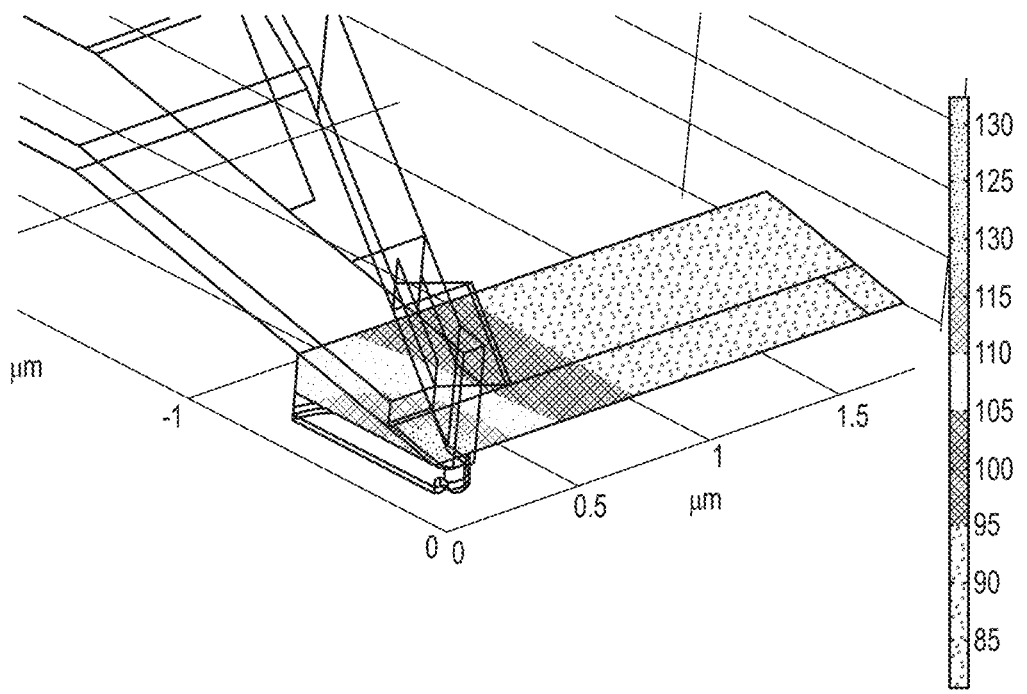
FIG. 8B is a heat distribution diagram for the heatsink structure of FIG. 7A according to embodiments described herein.

FIGS. 8A and 8B further illustrate the conductivity of heat from the NFT through heatsink structure 506 (FIG. 8A) and heatsink structure 706 (FIG. 8B). The heat diagrams illustrate how modifications, due to the write pole configuration, to a heatsink structure that extends in the cross-track direction affect the distribution of heat away from the NFT.

Figure 9A:
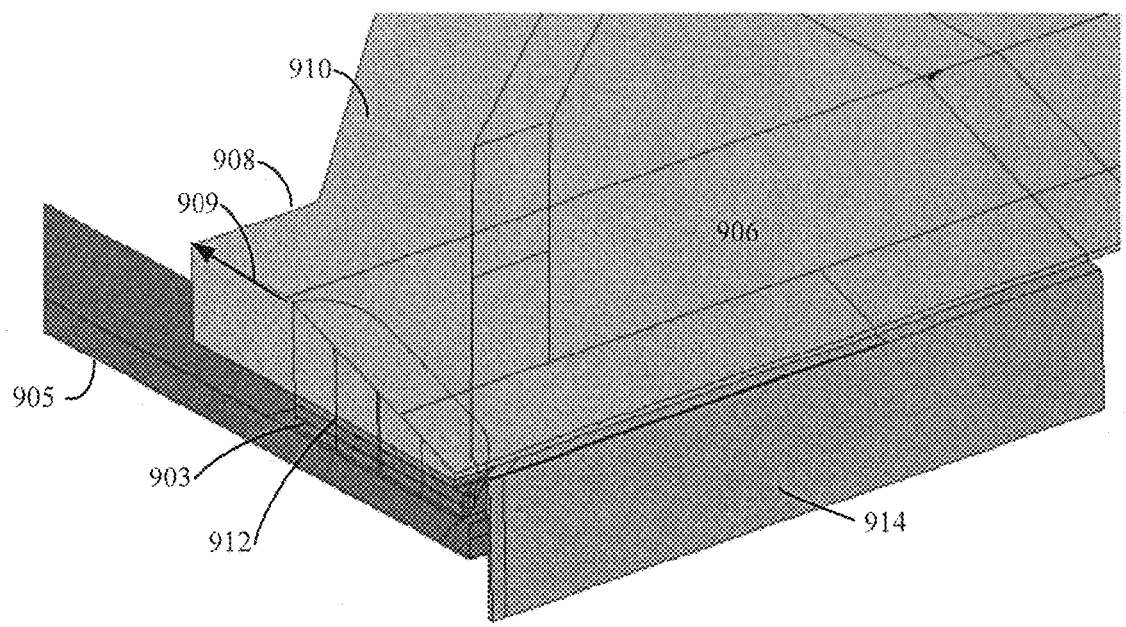
FIG. 9A is a perspective half view of a heatsink structure according to embodiments discussed herein.

Further modifications to a heatsink structure, as described above, are illustrated in FIGS. 9A-B. FIG. 9A is a perspective view of another heatsink structure 906. Similar to the heatsink structures described above, the heatsink structure extends from the NFT in the cross-track direction (in both directions, though only one side of the structure is shown in FIG. 9A). Heatsink structure 906 is positioned proximate NFT 903 with an optional middle disc 912 disposed between them. The middle disc 912 has the same footprint/shape as the underlying NFT and separates the heatsink structure 906 further away from the waveguide core 905, which is positioned on the opposing side of the NFT in the down-track direction. The heatsink structure is also shown coupled to another heatsink structure known as a miniSIM (solid immersion mirror) 914. The heatsink structure 906 differs from those discussed above in that it extends further into the recording head 908 as illustrated with arrow 909 (e.g., beyond the footprint of the NFT 903). The extended portion 908 can also optionally include a flare portion 910 that flares outward in the cross-track direction to further increase the size (e.g., amount of thermally conductive material) of the heatsink structure 906.

Figure 9B:
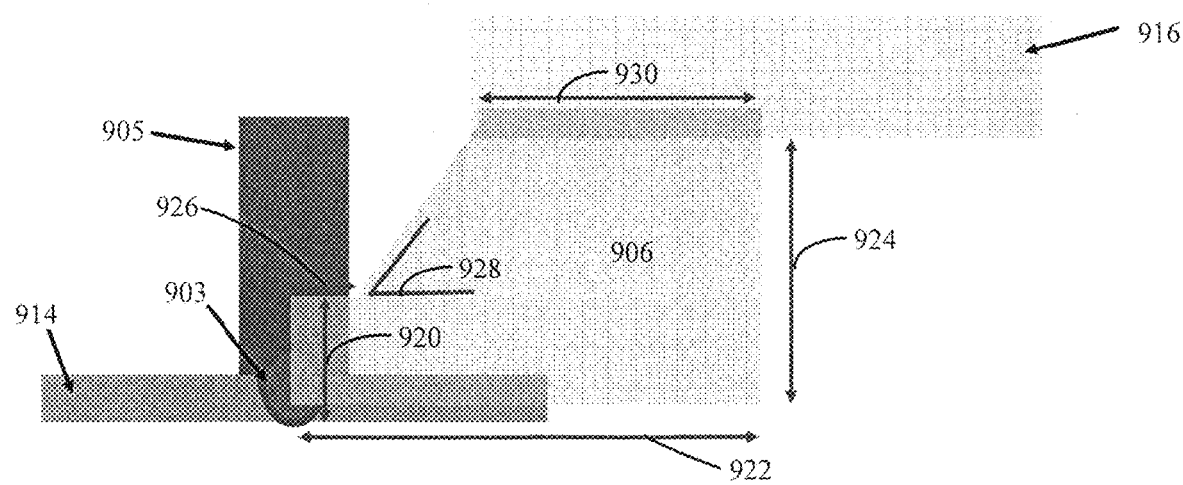
FIG. 9B is a top-down cartoon view of the heatsink structure of FIG. 9A according to embodiments discussed herein.

The increased shape of heatsink structure 906 is further illustrated in the top-down view of FIG. 9B. Heatsink structure 906 is again shown proximate the NFT 903, waveguide core 905, and miniSIM 914. An additional heatsink structure, a write pole heatsink 916 is positioned within the recording head. The write pole heatsink 916 extends through the top cladding, through the plane of the core 905, and through the bottom cladding of the waveguide below the core 905. Thus, heatsink structure 906 can connect the miniSIM 914 with the heat channel (shown above) and optionally with the write pole heatsink 916.

The various dimensions of heatsink structure 906 are shown, and each can be adjusted in view of numerous factors including writepole design, operating conditions, NFT design, etc. The width of the NFT structure 906 proximate the NFT 920 is the distance the NFT structure 906 extends from the ABS into the recording head. This distance can be from 500-5,000 nm, e.g., 1,000-2,000 nm depending on the NFT design. The heatsink structure 906 extends along the ABS for a length illustrated by arrow 922. This can be from 1-20 μm, but typically, the distance is less than 5 μm. A second width of the heatsink structure 906 extends from the ABS to the write pole heatsink 916 (typically a distance of a few μm) and is illustrated by arrow 924. The extended portion 908 in FIG. 9A has a length substantially parallel to the ABS illustrated by arrow 926. This distance ranges from 0-1,000 nm; however, it typically extends beyond the edge of the waveguide core 905. The flare portion 910 is defined by an angle from which the heatsink structure 906 extends from the extended portion 908. The angle is illustrated with reference numeral 928 and may vary between 0 and 90 degrees, with a typical angle being 45-60 degrees. The flare portion 910 then extends from the extended portion 908 to another heatsink structure, such as the write pole heatsink 916. A third length, illustrated by arrow 930, extends in a direction substantially parallel to the ABS along the other heatsink structure. Thus, length 930 is determined by the other geometry such as the write pole heatsink 916 or heat channel design. In a specific embodiment, if width 920 is the same as the NFT footprint and angle 928 is zero, then heatsink structure 906 would be the same as heatsink structure 506 and/or 706.

Figure 9C:
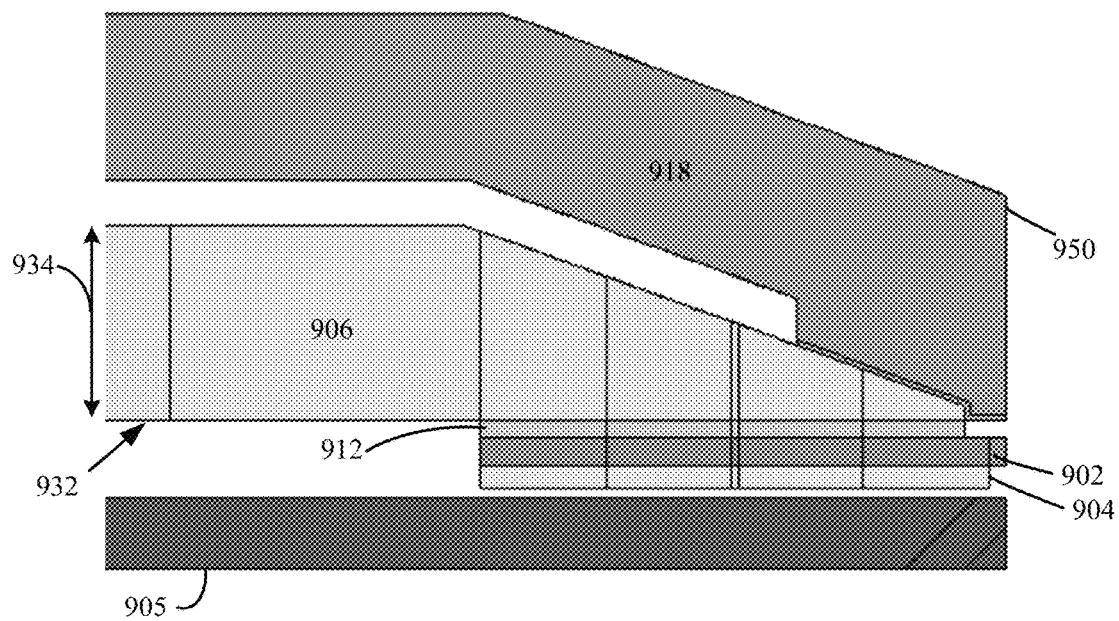
FIG. 9C is a cross-sectional view of the heatsink structure of FIG. 9A according to embodiments discussed herein.
Figure 9D:
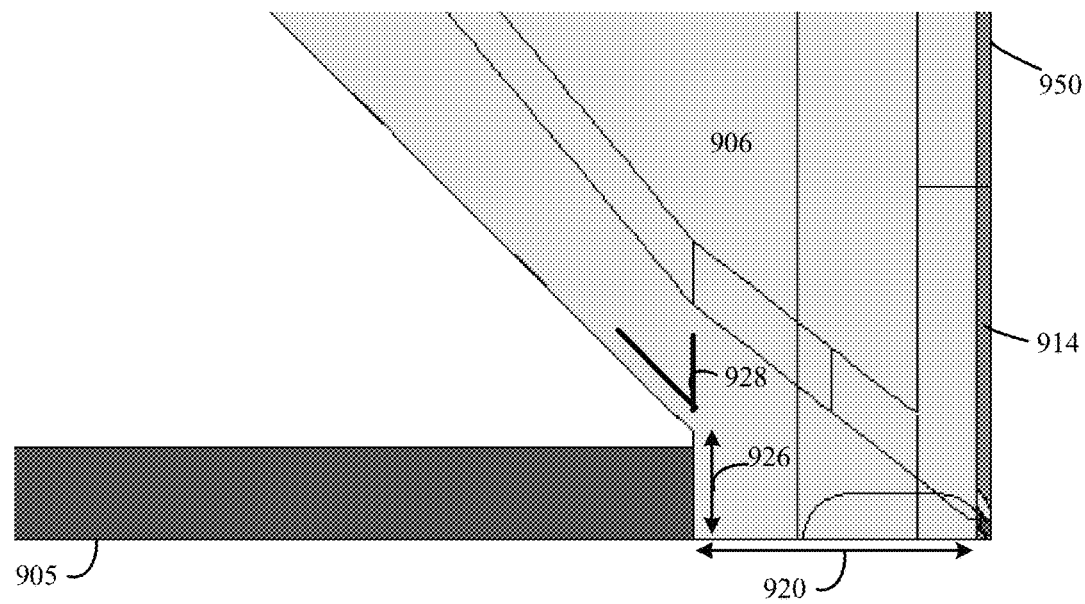
FIG. 9D is a top-down view of the heatsink structure of FIG. 9A showing various dimensions according to embodiments discussed herein.

FIGS. 9C-D provide additional views of the heatsink structure 906 within a recording head. FIG. 9C is a cross-sectional view of the heatsink structure 906 positioned with a write pole 918. The NFT 903 is shown as a bottom disc 904, a peg 902, and with an optional middle disc 912. The middle disc 912 improves the thermal gradient when a miniSIM is present in the head design. The cross-sectional view also illustrates the thickness of the heatsink structure 906, the extension of the structure 906 in the down-track direction, which is illustrated by arrow 934. The thickness ranges from 100 to 500 nm, depending on the head design. Notably, the top of the NFT 903/bottom of the heatsink structure 906, indicated by arrow 932, is at the same position along the ABS as the bottom of the write pole 918. The top-down view of FIG. 9D includes a miniSIM 914 at the ABS 950. The width 920 and angle 928 of the heatsink structure 906 are again illustrated, and the effects of varying these dimensions are discussed further below.

Figure 10A:
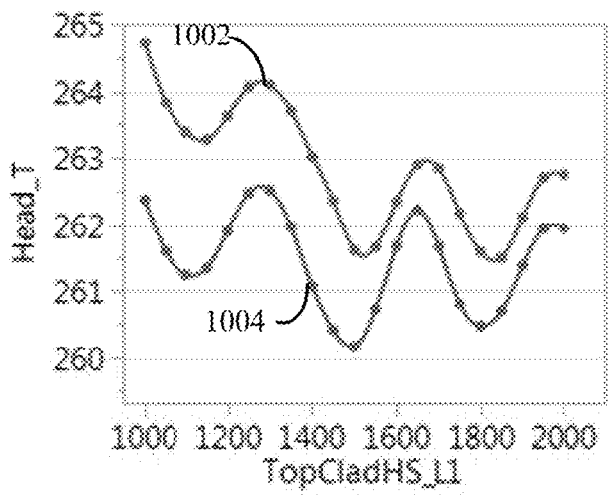
FIG. 10A illustrates the head temperature as a function of the distance the heatsink structure of FIG. 9A extends into the head from the ABS and as a function of the flare angle of the heatsink structure.
Figure 10B:
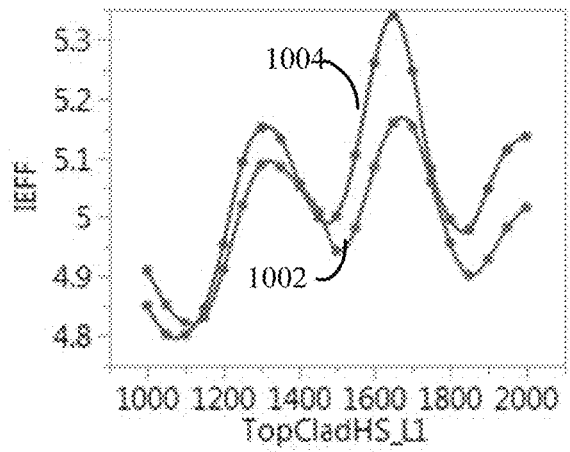
FIG. 10B illustrates the effective current as a function of the distance the heatsink structure of FIG. 9A extends into the head from the ABS and as a function of the flare angle of the heatsink structure.
Figure 10C:
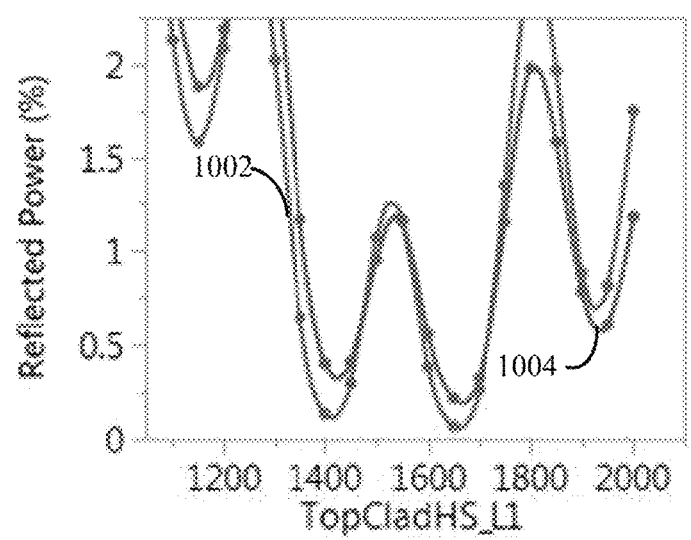
FIG. 10C illustrates the reflected power as a function of the distance the heatsink structure of FIG. 9A extends into the head from the ABS and as a function of the flare angle of the heatsink structure.

Changing the various dimensions of the heatsink structure 906 affects the performance of the recording head. FIGS. 10A-10C illustrate changing factors as a function of a change in the heatsink structure angle 928 and width 920. The figures include data for a heatsink structure 906 having a zero degree angle (data 1002) and having a forty-five degree angle (data 1004). FIG. 10A illustrates the change in recording head temperature as a function of the width 920 of the heatsink structure 906. FIG. 10B illustrates the change in the effective current for the recording head as a function of the width 920 of the heatsink structure 906, and FIG. 10C illustrates the change in reflected power for the recording head as a function of the width 920 of the heatsink structure 906. An optimal operating scenario appears when the width 920 is about 1,400 nm in to the recording head and a forty-five degree angle is present. However, changes in the NFT design would call for different optima. The peg 902 and bottom disc 904 temperatures are reduced by about ten Kelvin with the width 920 is about 1,400 nm, the length 926 is about 500 nm, and the angle is about forty-five degrees. At a width of about 1,650 nm to about 1,700 nm, there is a second minima in reflected power (shown in the figures along with the corresponding laser power and head temperature). Those reflections are dependent on the heatsink geometry as the light coming through the waveguide is interacting with it. A good compromise occurs at an intermediate between low reflection and lower head temperature. Similar results may be obtained using a heatsink structure with an alternative geometry/design.

Figure 11:
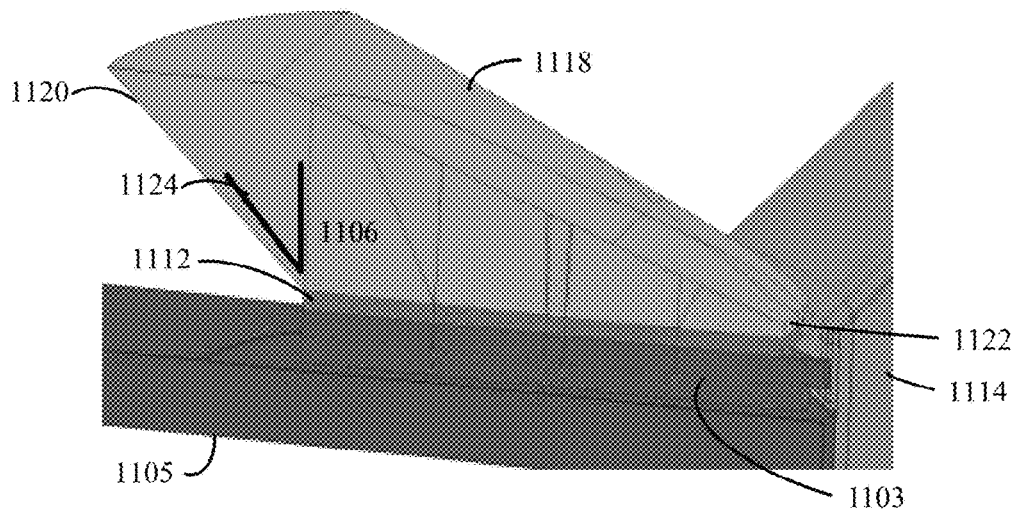
FIG. 11 is perspective half view of a heatsink structure according to embodiments discussed herein.

FIG. 11 illustrates another heatsink structure 1106 having a sloped top surface 1118. Similar to above, only half of the full-sized components (e.g., heatsink structure 1106) are shown. Also as above, the heatsink structure 1106 sits atop an NFT 1103, shown here including an optional middle disc 1112. The NFT 1103 is proximate the waveguide core 1105 and a miniSIM 1114. The top surface 1118 is sloped downward (toward the NFT 1103) in all directions, but the front edge 1122 is straight. The bottom surface of the heatsink structure 1106 has the same size/shape/footprint as the NFT 1103 (here the middle disc 1112). However, the back surface 1120 is angled away from the NFT 1103 in the down-track direction. This angle is measured from plane of the back of the NFT "down" toward the back surface 1120 of the heatsink structure 1106, and is designated by reference numeral 1124. Thus, the larger the angle, the more material present in heatsink structure 1106. Changing this angle alters the operating conditions within the head as discussed further below.

Figure 12A:
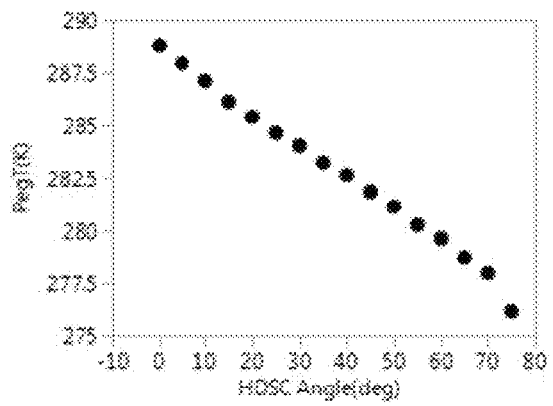
FIG. 12A illustrates the peg temperature as a function of the slope angle of the heatsink structure of FIG. 11.
Figure 12B:
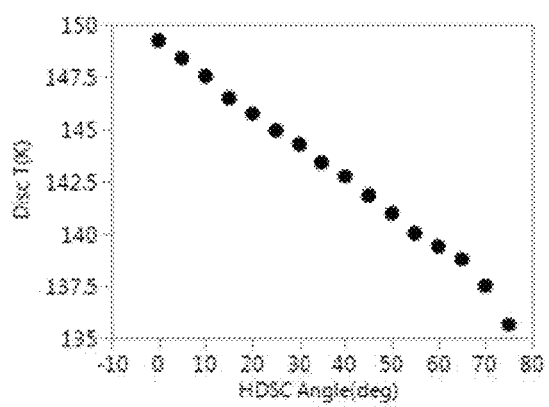
FIG. 12B illustrates the disc temperature as a function of the slope angle of the heatsink structure of FIG. 11.
Figure 12C:
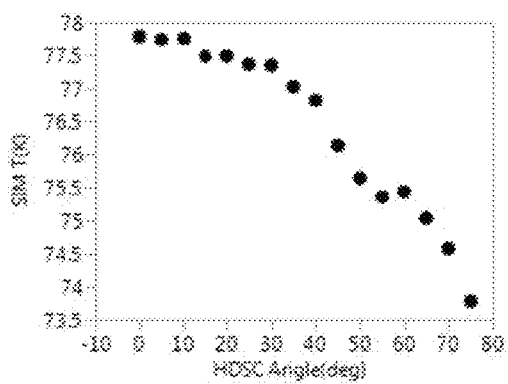
FIG. 12C illustrates the solid immersion mirror temperature as a function of the slope angle of the heatsink structure of FIG. 11.
Figure 12F:
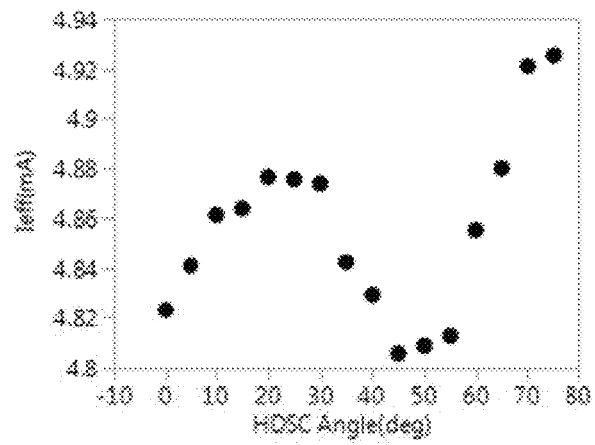
FIG. 12F illustrates the down-track thermal gradient as a function of the slope angle of the heatsink structure of FIG. 11.
Figure 12F:
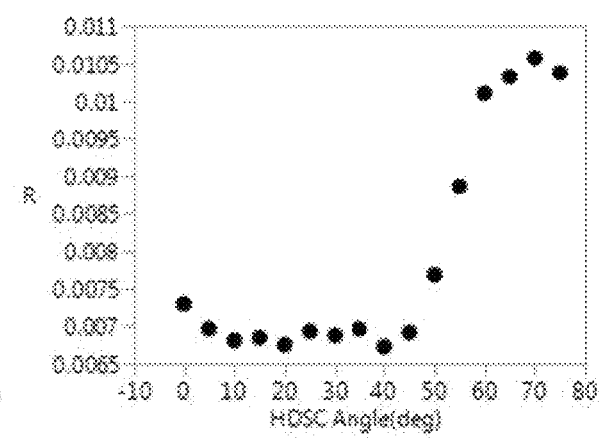
Figure 12F:
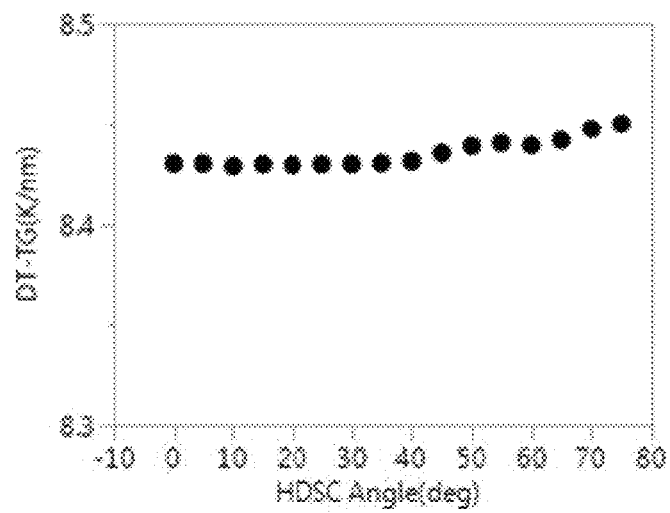

FIGS. 12A-F show the measured changes in various operating parameters as a function of changing the angle of back surface 1120. FIG. 12A illustrates the change in NFT peg temperature as a function of the changing back surface angle. FIG. 12B illustrates the change in NFT disc temperature as a function of the changing back surface angle. FIG. 12C illustrates the change in the miniSIM temperature as a function of the changing back surface angle. FIG. 12D illustrates the change in effective current as a function of the changing back surface angle. FIG. 12E illustrates the change in reflected power as a function of the changing back surface angle. FIG. 12F illustrates the change in the down-track thermal gradient as a function of the changing back surface angle. As can be seen, as the angle increases, the temperatures for the peg, disc, and mini SIM all decrease. For example, there is an approximately 11 K decrease in temperature. There is also an increase of about 2% in the effective current for this heatsink structure design.

Figure 13:
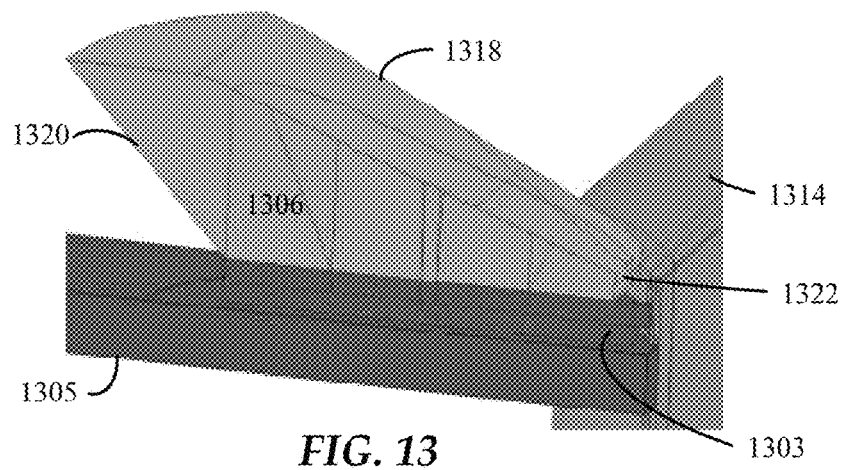
FIG. 13 is perspective half view of a heatsink structure according to embodiments discussed herein.

FIG. 13 illustrates another heatsink structure 1306 having a sloped top surface 1318. Similar to above, only half of the full-sized components (e.g., heatsink structure 1306) are shown. Also as above, the heatsink structure 1306 sits atop an NFT 1303. The NFT 1303 is proximate the waveguide core 1305 and a miniSIM 1314. The top surface 1318 is sloped downward (toward the NFT 1303) in all directions, but the front edge 1322 is straight. The bottom surface of the heatsink structure 1306 has the same size/shape/footprint as the NFT 1303. Heatsink structure 1306 differs from that of heatsink structure 1106 in that no middle disc is present. A middle disc is characterized by being a structure separated from the top heatsink or when the dimensions differ. However, the back surface 1320 is angled away from the NFT 1303 in the down-track direction. As above, this angle is measured from plane of the back of the NFT "down" toward the back surface 1320 of the heatsink structure 1306. Thus, the larger the angle, the more material present in heatsink structure 1306. Changing this angle alters the operating conditions within the head as discussed further below.

Figure 14A:
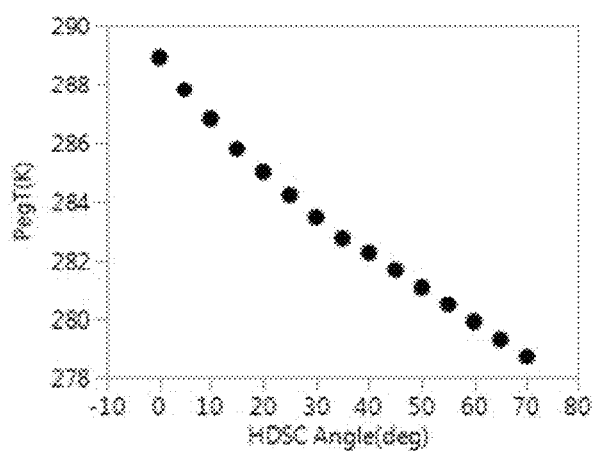
FIG. 14A illustrates the peg temperature as a function of the slope angle of the heatsink structure of FIG. 13.
Figure 14B:
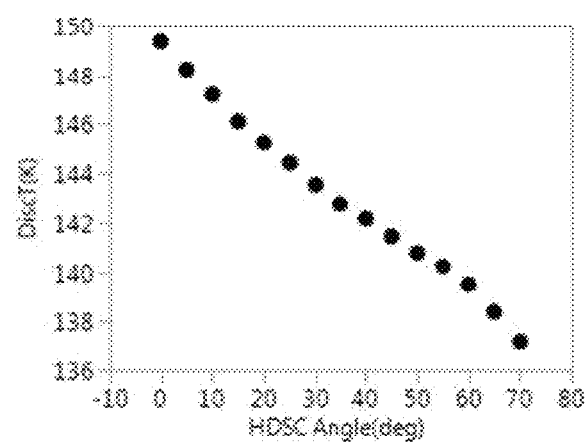
FIG. 14B illustrates the disc temperature as a function of the slope angle of the heatsink structure of FIG. 13.
Figure 14C:
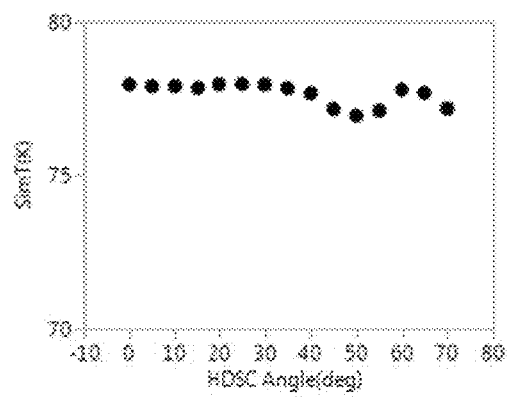
FIG. 14C illustrates the solid immersion mirror (SIM) temperature as a function of the slope angle of the heatsink structure of FIG. 13.
Figure 14D:
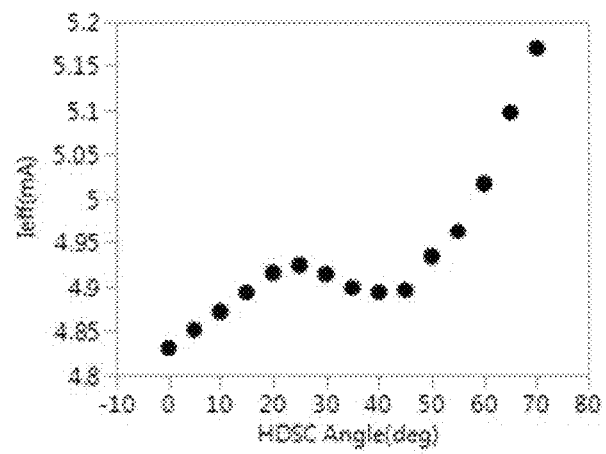
FIG. 14D illustrates the effective current as a function of the slope angle of the heatsink structure of FIG. 13.
Figure 14E:
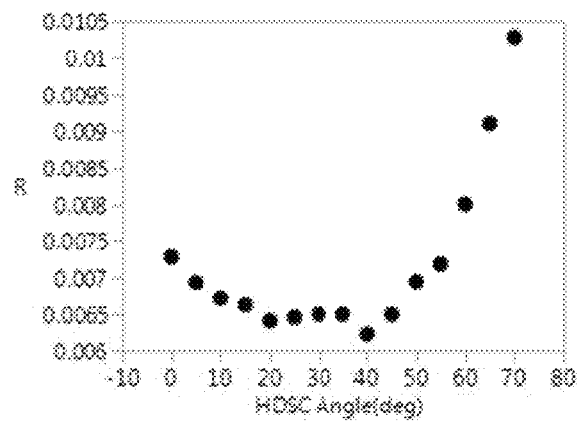
FIG. 14E illustrates the reflected power as a function of slope angle of the heatsink structure of FIG. 13.
Figure 14F:
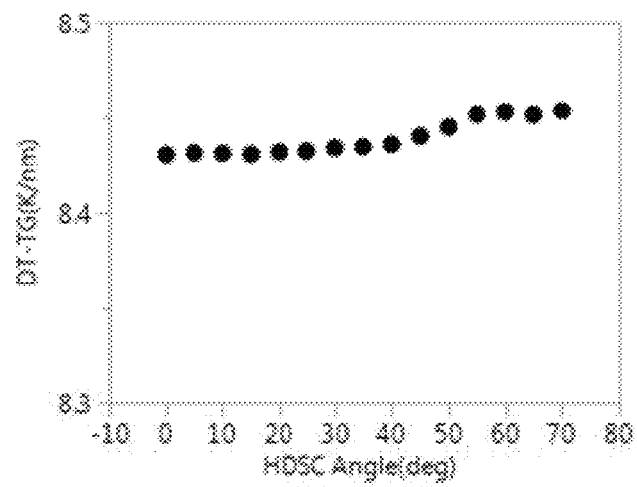
FIG. 14F illustrates the down-track thermal gradient as a function of the slope angle of the heatsink structure of FIG. 13.

FIGS. 14A-F show the measured changes in various operating parameters as a function of changing the angle of back surface 1320. FIG. 14A illustrates the change in NFT peg temperature as a function of the changing back surface angle. FIG. 14B illustrates the change in NFT disc temperature as a function of the changing back surface angle. FIG. 14C illustrates the change in the miniSIM temperature as a function of the changing back surface angle. FIG. 14D illustrates the change in effective current as a function of the changing back surface angle. FIG. 14E illustrates the change in reflected power as a function of the changing back surface angle. FIG. 14F illustrates the change in the down-track thermal gradient as a function of the changing back surface angle. As can be seen, as the angle increases, the temperatures for at least the NFT peg and disc decrease. For example, there is an approximately 10 K decrease in temperature. There is also an increase of about 7.5% in the effective current for this heatsink structure design.

Figure 15A:
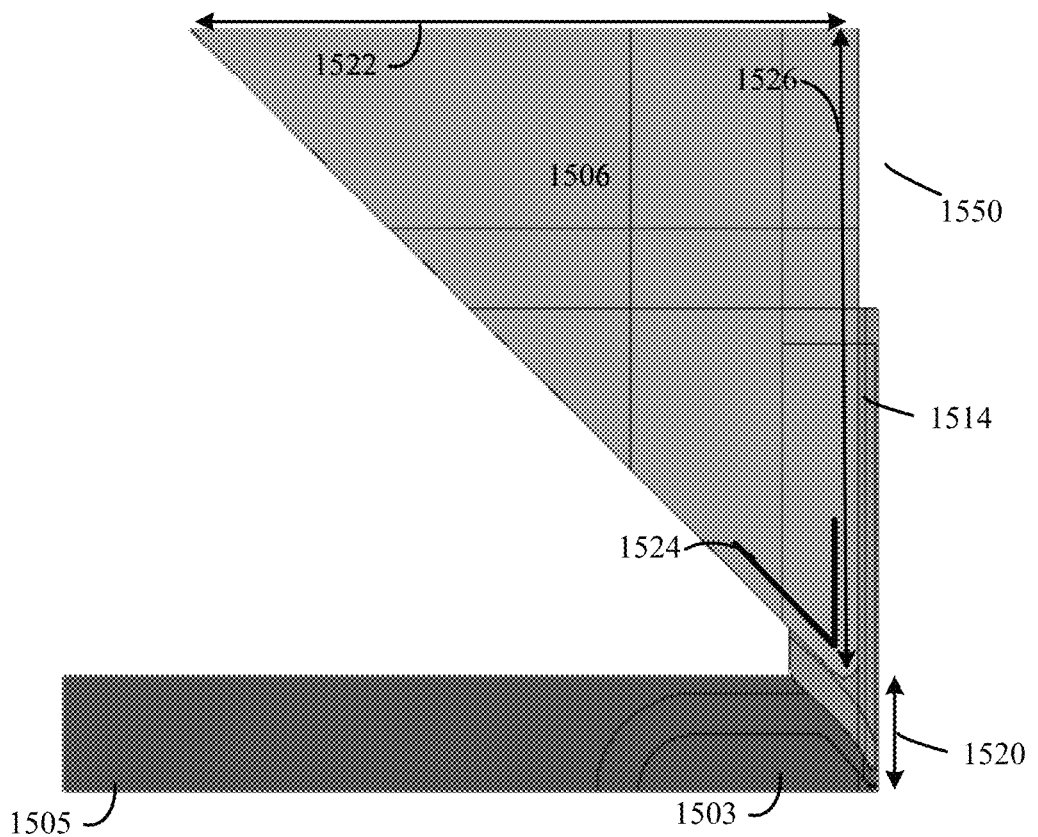
Figure 15B:
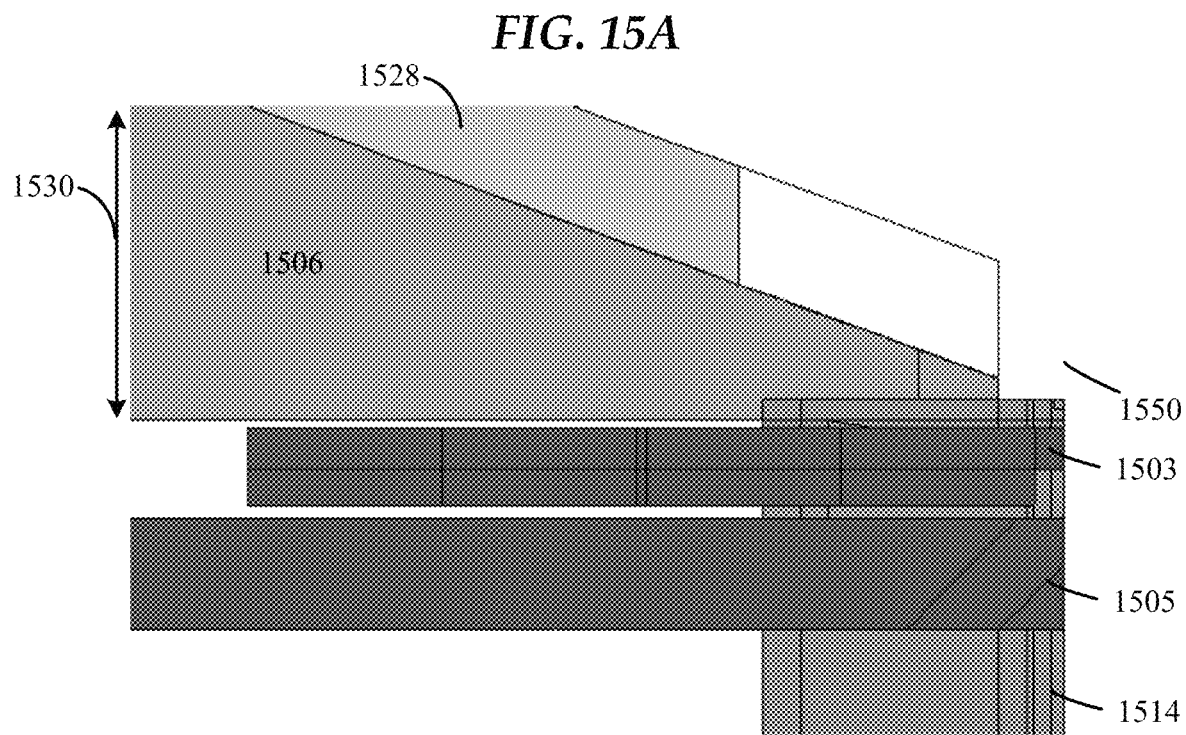
FIG. 15B is a cross-sectional view of the heatsink structure of FIG. 15A.

A further heatsink structure 1506 that extends in the cross-track direction is illustrated in FIGS. 15A-B. FIG. 15A is a top-down view of the heatsink 1506, but while the structure 1506 extends in both cross-track directions, only one side of the structure 1506 is shown in FIG. 15A. Heatsink structure 1506 has a wedge shape that narrows in thickness in the direction of the ABS, similar to the heatsink structures discussed above. While the heatsink structure 1506 is positioned proximate the waveguide core 1505 and the NFT 1503, it is separated from the NFT/core midline, as indicated by arrow 1520. The heatsink structure 1506 is angled away from the NFT/core as indicated by angle 1524. The angle can vary from 20-70 degrees, and can be about 45 degrees in certain embodiments. The closest point of the heatsink structure along the ABS 1550 defines the separation of the heatsink structure 1506 from the NFT/core midline 1520. The separation can range from 100-500 nm, and in certain embodiments is about, or greater than, 300 nm. The heatsink structure extends in the cross-track direction 1526 about 1-50 µm, and in certain embodiments, it extends about 10 µm along the ABS. The heatsink structure 1506 also extends into the recording head 1522 about 1-50 µm, and in certain embodiments, it extends about 10 µm in. The heatsink structure 1506 may extend into the recording head 1522 far enough to connect with another heatsink structure, such as a write pole heatsink. In certain embodiments, heatsink structure 1506 is designed to connect a miniSIM 1514 to a heat channel and/or write pole heatsink without modifying other transducer components that interact with the light path (e.g., waveguide core 1505, NFT 1503).

This is further illustrated in the cross-sectional view of FIG. 15B. The heatsink structure 1506 is also shown proximate a heat channel 1528. As discussed above, the top surface of the heatsink structure 1506 follows the profile of cladding or other structures adjacent the heatsink structure 1506. Thus, the heatsink structure 1506 profile may be determined by the write pole and/or NFT design. The largest thickness of the heatsink structure 1506 is illustrated with arrow 1530 and may range from about 100 nm to about 500 nm. When compared with a recording head without a heatsink structure 1506, a recording head with a heatsink structure 1506 shows maintained, or improved, performance with reduced temperatures. Example comparison results are shown below in Tables 2A-B.

TABLE 2A

| Model | T (° C.) | TG Down-track | TG Cross-track | Effective Current | Adjacent Track Erasure |
|---|---|---|---|---|---|
| Without Heatsink 1506 | 286 | 8.4 | 8.5 | 4.6 | 52.3 |
| With Heatsink 1506 | 281 | 8.4 | 8.6 | 4.6 | 52.3 |

TABLE 2B

| Model | Reflected Power (%) | Head Power (%) | Bottom Disc T (° C.) | MiniSIM T (° C.) | Pole T (° C.) |
|---|---|---|---|---|---|
| Without Heatsink 1506 | 0.03 | 54 | 147 | 74 | 81 |
| With Heatsink 1506 | 0.08 | 55 | 141 | 68 | 76 |

The results for the model including a heatsink 1506 were obtained using a heatsink with a 350 nm separation from the midline of the NFT/waveguide core. This separation distance was determined by varying the heatsink separation from the midline and obtaining the data below.

Figure 16A:
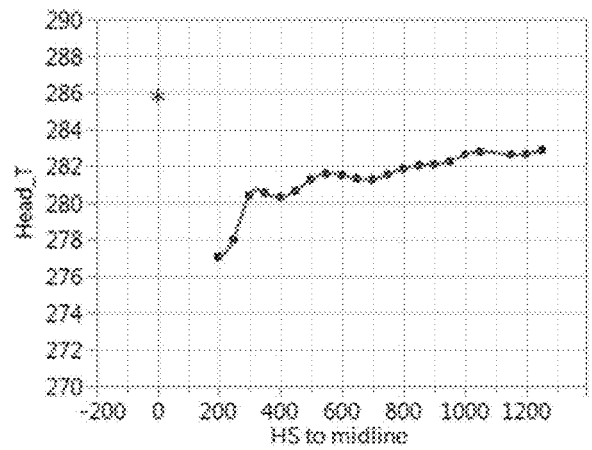
FIG. 16A illustrates the head temperature as a function of the distance between the midline of the NFT and the heatsink structure of FIG. 15A.
Figure 16B:
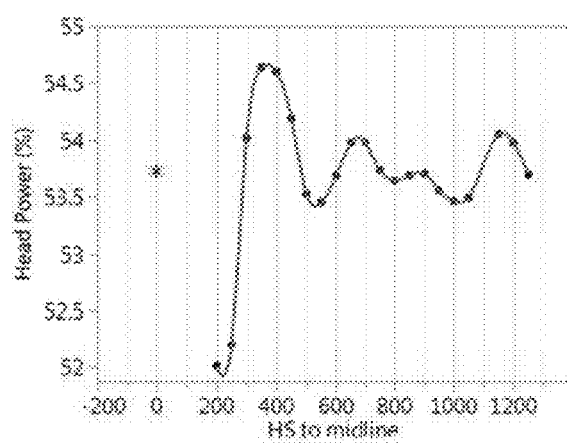
FIG. 16B illustrates the head power as a function of the distance between the midline of the NFT and the heatsink structure of FIG. 15A.
Figure 16C:
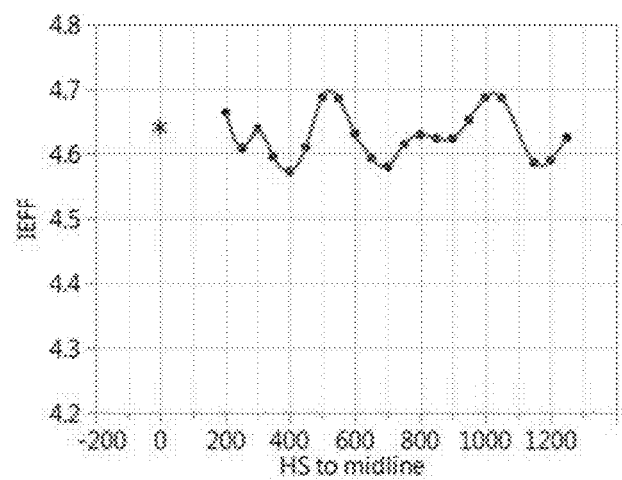
FIG. 16C illustrates the effective current as a function of the distance between the midline of the NFT and the heatsink structure of FIG. 15A.
Figure 16D:
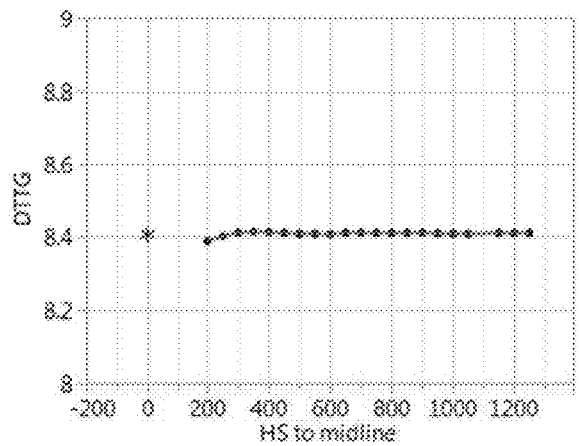
FIG. 16D illustrates the down-track thermal gradient as a function of the distance between the midline of the NFT and the heatsink structure of FIG. 15A.
Figure 16E:
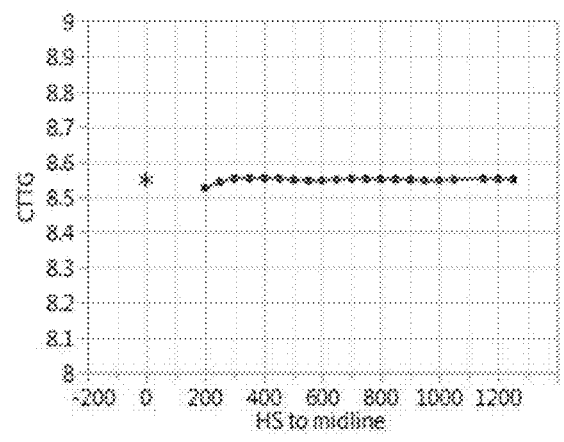
FIG. 16E illustrates the cross-track thermal gradient as a function of the distance between the midline of the NFT and the heatsink structure of FIG. 15A.
Figure 16F:
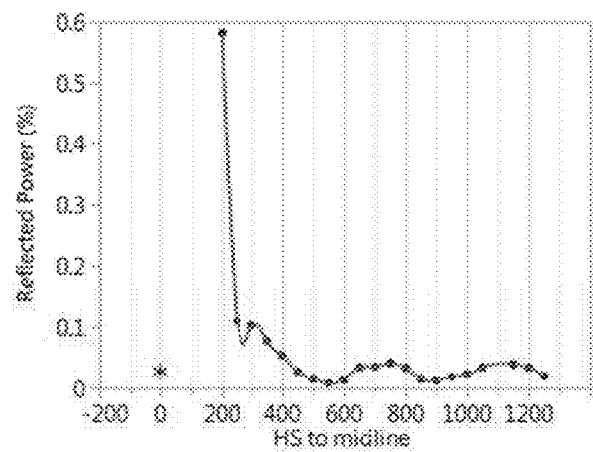
FIG. 16F illustrates the reflected power as a function of the distance between the midline of the NFT and the heatsink structure of FIG. 15A.

FIGS. 16A-F show data collected for various operating parameters as a function of the distance the heatsink structure 1506 is separated from the midline of the NFT/waveguide core. FIG. 16A illustrates the overall head temperature, FIG. 16B illustrates the head power, and FIG. 16C illustrates the effective current as a function of the separation distance from the midline 1520. FIG. 16D illustrates the down-track thermal gradient, FIG. 16E illustrates the cross-track thermal gradient, and FIG. 16F illustrates the reflected power as a function of the separation distance from the midline 1520. The separation distance of 350 nm provides an acceptable tradeoff between temperature and reflected power. Both of which will improve the reliability and longevity of the recording head.

Figure 17A:
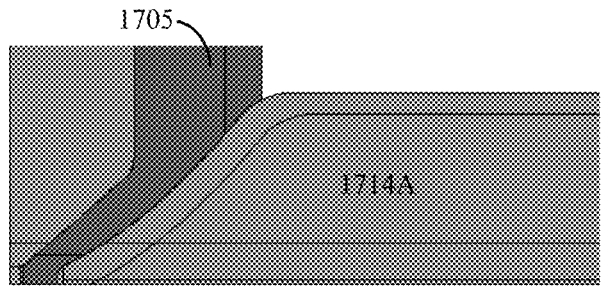
FIG. 17A is a top-down view half view of a miniSIM according to embodiments discussed herein.
Figure 17B:
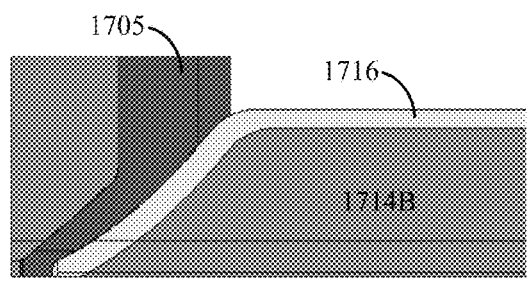
FIG. 17B is a top-down view half view of a miniSIM including a gold liner according to embodiments discussed herein.

Further improvements in operating conditions can be achieved by including a bottom reflector in the recording head with, or without, heatsink structure 1506. The improvements may also be affected by the design of the miniSIM. FIGS. 17A-B illustrate alternative miniSIM designs. FIG. 17A shows miniSIM 1714A proximate a waveguide core 1705. The miniSIM 1714A comprises all one material (e.g., rhodium). Alternative, FIG. 17B shows miniSIM 1714B, which comprises a liner 1716 of another material (e.g., gold).

Figure 18A:
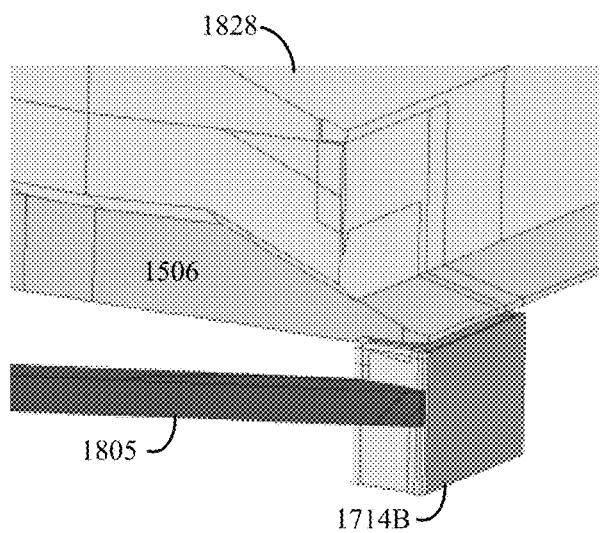
FIG. 18A is a perspective half view of the heatsink structure of FIG. 15A coupled with other heatsink structures according to embodiments discussed herein.
Figure 18B:
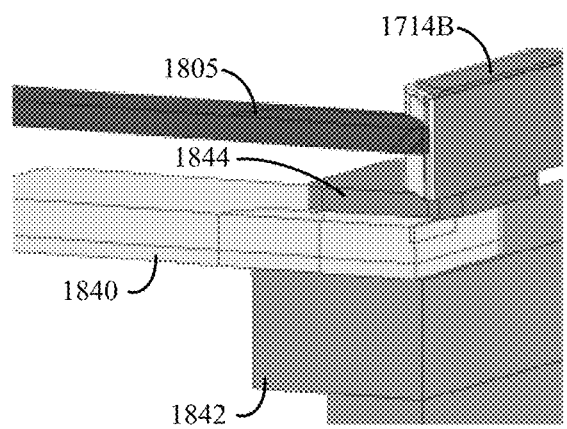
FIG. 18B is a perspective half view of a bottom reflector coupled with a heatsink structure of FIG. 18A according to embodiments discussed herein.

FIGS. 18A-B illustrate the relationships between heatsink 1506, a miniSIM (miniSIM 1714B), and a bottom reflector. FIG. 18A shows the top portion of the head and FIG. 18B shows the bottom/down-track portion, where the waveguide 1805 and miniSIM 1714B are shown in both for orientation. As discussed above, only half of the structures are shown for illustration purposes. The heatsink structure 1506 is positioned between heat channel 1828 and miniSIM 1714B to connect and direct heat away from the NFT through heat channel 1828, as discussed above. The bottom reflector 1840 is positioned in the down-track direction from the waveguide core 1805 and is coupled to the bottom cladding of the waveguide. The bottom reflector 1840 is separated from the miniSIM 1714B by a rhodium via. The bottom reflector

1840 may (as shown) or may not touch the leading shield 1842. Varying combinations of these components has different effects on the NFT and miniSIM temperatures as discussed below.

The impact of the presence of a heatsink 1506 is shown below in Table 3 for both types of miniSIMs. The temperature columns indicate by how much the temperature was reduced as compared with a base configuration.

TABLE 3

| Configuration | | miniSIM T (° C.) | NFT Peg T (° C.) |
|---|---|---|---|
| miniSIM 1714A | Heatsink 1506 - NO | −58.8 | −12.4 |
| miniSIM 1714A | Heatsink 1506 - YES | −28.7 | −7.6 |
| miniSIM 1714B | Heatsink 1506 - NO | −14 | −2.9 |
| miniSIM 1714B | Heatsink 1506 - YES | −7.3 | −1.7 |

In addition, the impact of the presence of a bottom reflector 1840, and whether the bottom reflector touches the leading shield 1842 is shown below in Table 4 for both types of miniSIMs.

TABLE 4

| Configuration | | miniSIM T (° C.) | NFT Peg T (° C.) |
|---|---|---|---|
| miniSIM 1714A | NO bottom reflector | −39.2 | −6.3 |
| miniSIM 1714A | BR not touching LS | −19.2 | −3.2 |
| miniSIM 1714A | BR touching LS | −9.0 | −1.4 |
| miniSIM 1714B | NO bottom reflector | −8.4 | −2.8 |
| miniSIM 1714B | BR not touching LS | −5.3 | −2.3 |
| miniSIM 1714B | BR touching LS | −1.8 | −1.6 |

Use of the bottom reflector can reduce the temperature of the mini SIM more effectively than heatsink structure 1506 with the added advantage of reducing the necessary laser diode current. For example, a bottom reflector (without heatsink structure 1506) can reduce temperature about 14 K, whereas heatsink structure 1506 (without a bottom reflector) can reduce temperature about 8 K. However, these results may vary depending upon the design of the miniSIM. The heatsink structure 1506 substantially reduces the temperature of miniSIM 1714A (e.g., reduces about 30 to about 60 K) regardless of whether a bottom reflector is present. However, for a miniSIM 1714B, there is a useful temperature reduction for heatsink structure 1506 only when a bottom reflector is absent.

In view of the above, various write operation temperatures are reduced by increasing the amount of heatsink material in the recording head through introduction of heatsink structures (e.g., heatsink structures that extend in a cross-track direction). These structures enable heat transfer while not interfering with the optical properties of the waveguide/NFT energy delivery components. This leads to reduced temperatures of critical components, which improves the reliability and longevity of the recording head.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. A recording head, comprising:
a write pole extending to an air-bearing surface and having a sloped first side in a down-track direction;
a near-field transducer positioned proximate the sloped first side of the write pole in the down-track direction, the near-field transducer comprising a peg coupled with a bottom portion; and
a heatsink structure adjacent to and in contact with the bottom portion and positioned between the near-field transducer and the write pole, the heatsink structure comprising:
a first surface;
an opposing surface that is sloped toward the first surface, a slope of the opposing surface conforming to a slope of the sloped first side of the write pole;
a first edge extending between the first surface and the opposing surface, the first edge proximate to the air-bearing surface; and
an opposing edge opposite the first edge extending between the first surface and the opposing surface, the opposing edge distal the air-bearing surface;
wherein the heatsink structure comprises a sloped extension that extends beyond the near-field transducer in a cross-track direction to define a wing shape, the sloped extension in contact with the bottom portion of the near-field transducer and conforming to the slope of the sloped first side of the write pole.

2. The recording head of claim 1, wherein the bottom portion comprises gold.

3. The recording head of claim 1, further comprising a mini solid immersion mirror (miniSIM) connected to the first edge of the heatsink structure.

4. The recording head of claim 3, wherein the miniSIM comprises rhodium.

5. The recording head of claim 3, wherein the miniSIM comprises a liner, the liner comprising gold.

6. The recording head of claim 1, further comprising a diffuser coupled to the opposing edge of the heatsink structure.

7. The recording head of claim 1, wherein the opposing edge of the heatsink structure is aligned with an edge of the bottom portion.

8. The recording head of claim 1, wherein the first surface of the heatsink structure extends beyond an edge of the bottom portion such that the opposing edge is farther from the air-bearing surface than the edge of the bottom portion.

9. The recording head of claim 1, wherein the bottom portion extends beyond the opposing edge of the heatsink structure such that an edge of the bottom portion is farther from the air-bearing surface than the opposing edge of the heatsink structure.

10. A recording head, comprising:
a write pole extending to an air-bearing surface and having a sloped first side in a down-track direction;
a near-field transducer positioned proximate the sloped first side of the write pole in the down-track direction, the near-field transducer comprising a peg coupled with a bottom portion; and
a heatsink structure adjacent to and in contact with the bottom portion and positioned between the near-field transducer and the write pole, the heatsink structure comprising:
a first surface;
a second surface forming a wedge shape with the first surface, the second surface sloped toward the first surface in a direction toward the air-bearing surface, a slope of the second surface conforming to that of the sloped first side of the write pole;
a first edge extending between the first surface and the second surface, the first edge proximate to the air-bearing surface; and
an opposing edge opposite the first edge extending between the first surface and the second surface;
wherein the heatsink structure comprises a sloped extension that extends beyond the near-field transducer in a cross-track direction to define a wing shape, the sloped extension in contact with the bottom portion of the near-field transducer and conforming to the slope of the sloped first side of the write pole.

11. The recording head of claim 10, wherein the bottom portion comprises gold.

12. The recording head of claim 10, further comprising a mini solid immersion mirror (miniSIM) connected to the first edge of the heatsink structure.

13. The recording head of claim 12, wherein the miniSIM comprises rhodium.

14. The recording head of claim 12, wherein the miniSIM comprises a liner, the liner comprising gold.

15. The recording head of claim 10, further comprising a diffuser coupled to the opposing edge of the heatsink structure.

16. The recording head of claim 10, wherein the opposing edge of the heatsink structure is aligned with an edge of the bottom portion.

17. The recording head of claim 10, wherein the first surface of the heatsink structure extends beyond an edge of the bottom portion such that the opposing edge is farther from the air-bearing surface than the edge of the bottom portion.

18. The recording head of claim 10, wherein the bottom portion extends beyond the opposing edge of the heatsink structure such that an edge of the bottom portion is farther from the air-bearing surface than the opposing edge of the heatsink structure.

* * * * *